(12) United States Patent
Morita et al.

(10) Patent No.: US 8,312,510 B2
(45) Date of Patent: Nov. 13, 2012

(54) AUTHENTICATION TERMINAL AND NETWORK TERMINAL

(75) Inventors: Chihiro Morita, Tokyo (JP); Toshimitsu Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 384 days.

(21) Appl. No.: 12/674,631

(22) PCT Filed: Aug. 28, 2008

(86) PCT No.: PCT/JP2008/065401
§ 371 (c)(1),
(2), (4) Date: Feb. 22, 2010

(87) PCT Pub. No.: WO2009/028606
PCT Pub. Date: Mar. 5, 2009

(65) Prior Publication Data
US 2011/0277020 A1 Nov. 10, 2011

(30) Foreign Application Priority Data
Aug. 29, 2007 (JP) ................................ 2007-222485

(51) Int. Cl.
*H04L 9/321* (2006.01)
(52) U.S. Cl. .................. 726/2; 726/3; 726/4; 726/5
(58) Field of Classification Search .................. 713/150, 713/155–156, 168–173; 726/2–5, 10, 12
See application file for complete search history.

(56) References Cited

U.S. PATENT DOCUMENTS 6,324,648 B1 * 11/2001 Grantges, Jr. ................... 726/12
6,996,841 B2 * 2/2006 Kadyk et al. .................... 726/12

FOREIGN PATENT DOCUMENTS

| JP | 2001-296774 A | 10/2001 |
| JP | 2004-128532 A | 4/2004 |
| JP | 2005-78371 A | 3/2005 |
| JP | 2006-180379 A | 7/2006 |

* cited by examiner

*Primary Examiner* — Hosuk Song
(74) *Attorney, Agent, or Firm* — Birch, Stewart, Kolasch & Birch, LLP

(57) ABSTRACT

Responsive to a proxy authentication request from a network terminal, a display for prompting a user to start an authentication operation is performed; authentication data for performing personal authentication are read by a user operation; an authentication request is sent together with the read authentication data to an authentication server; an authentication result is received from the authentication server; the network terminal is notified of the result. When a service requiring personal authentication is used, via a network, a request for proxy authentication can be made from a network terminal lacking an interface for personal authentication to a proxy authentication terminal having an interface for personal authentication, whereby the interface of the proxy authentication terminal can be used to perform the personal authentication.

12 Claims, 23 Drawing Sheets

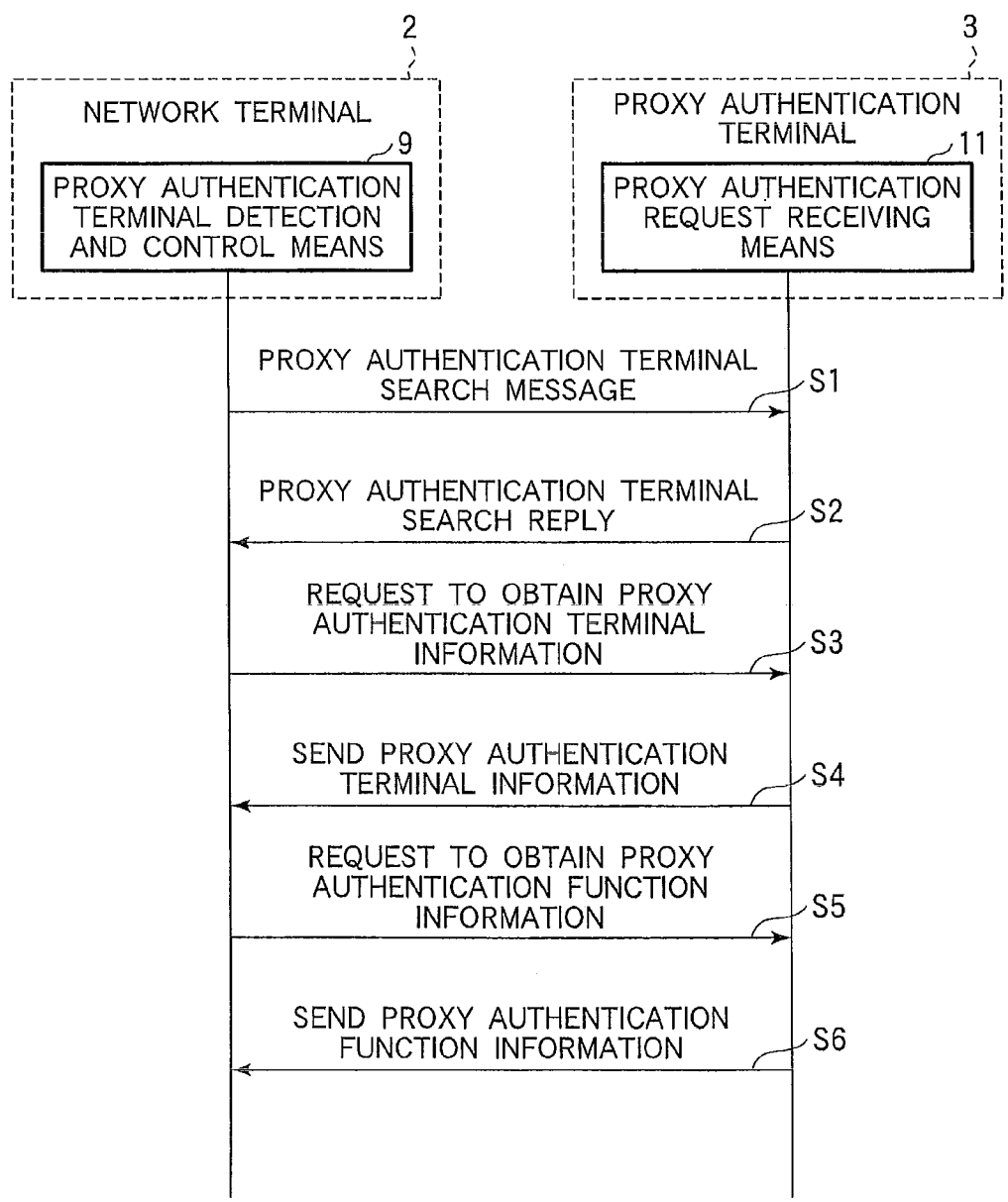

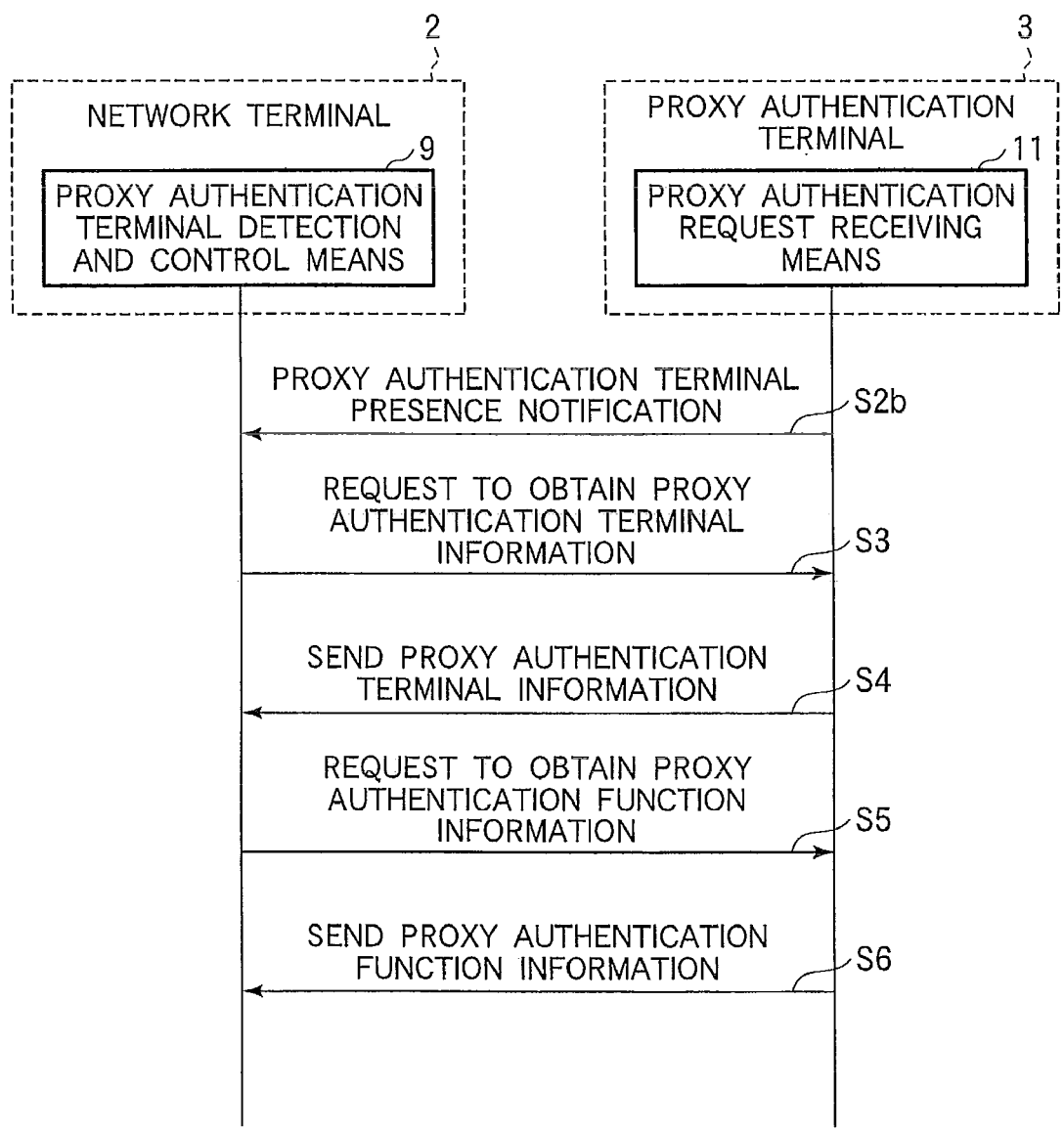

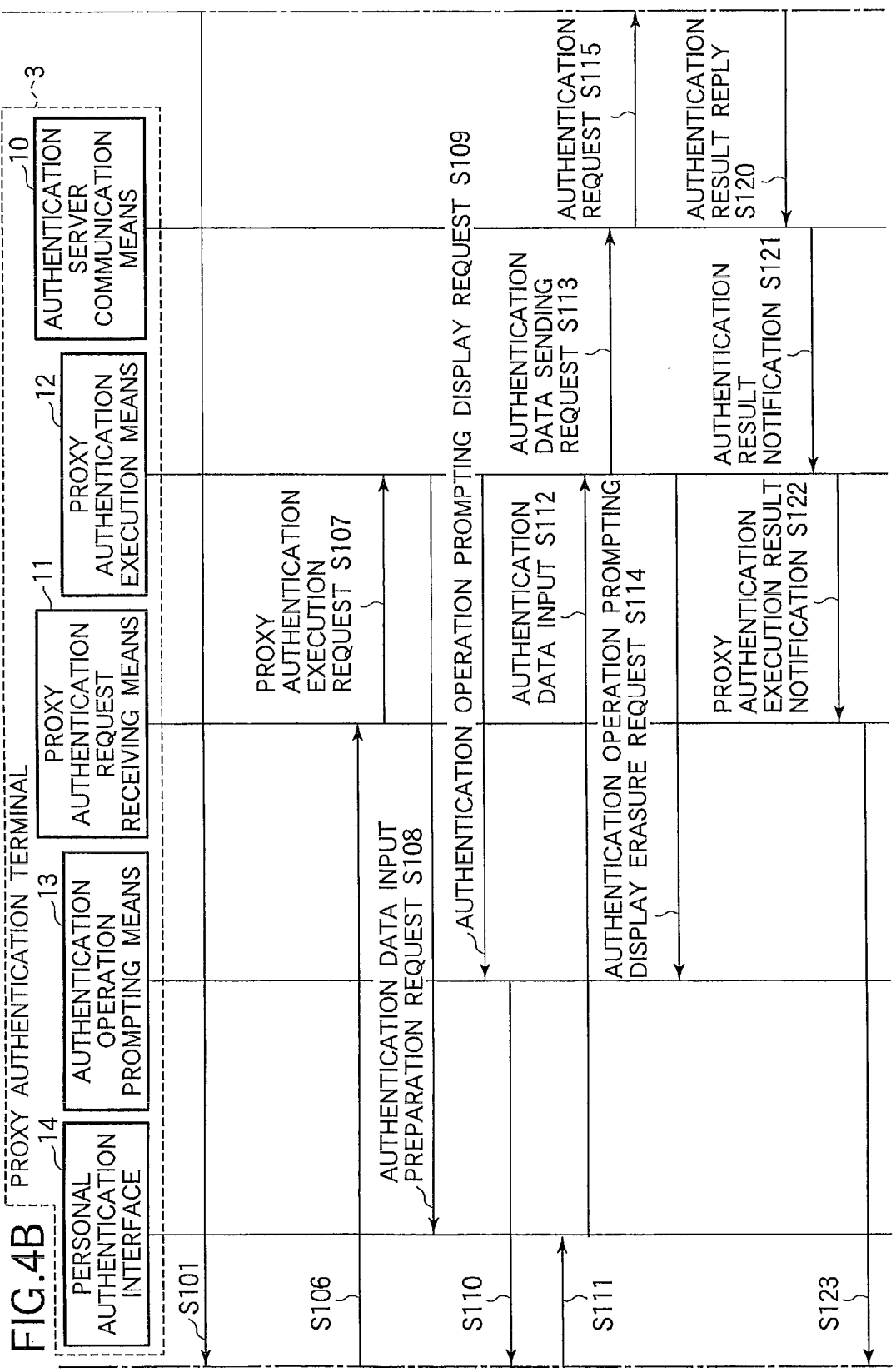

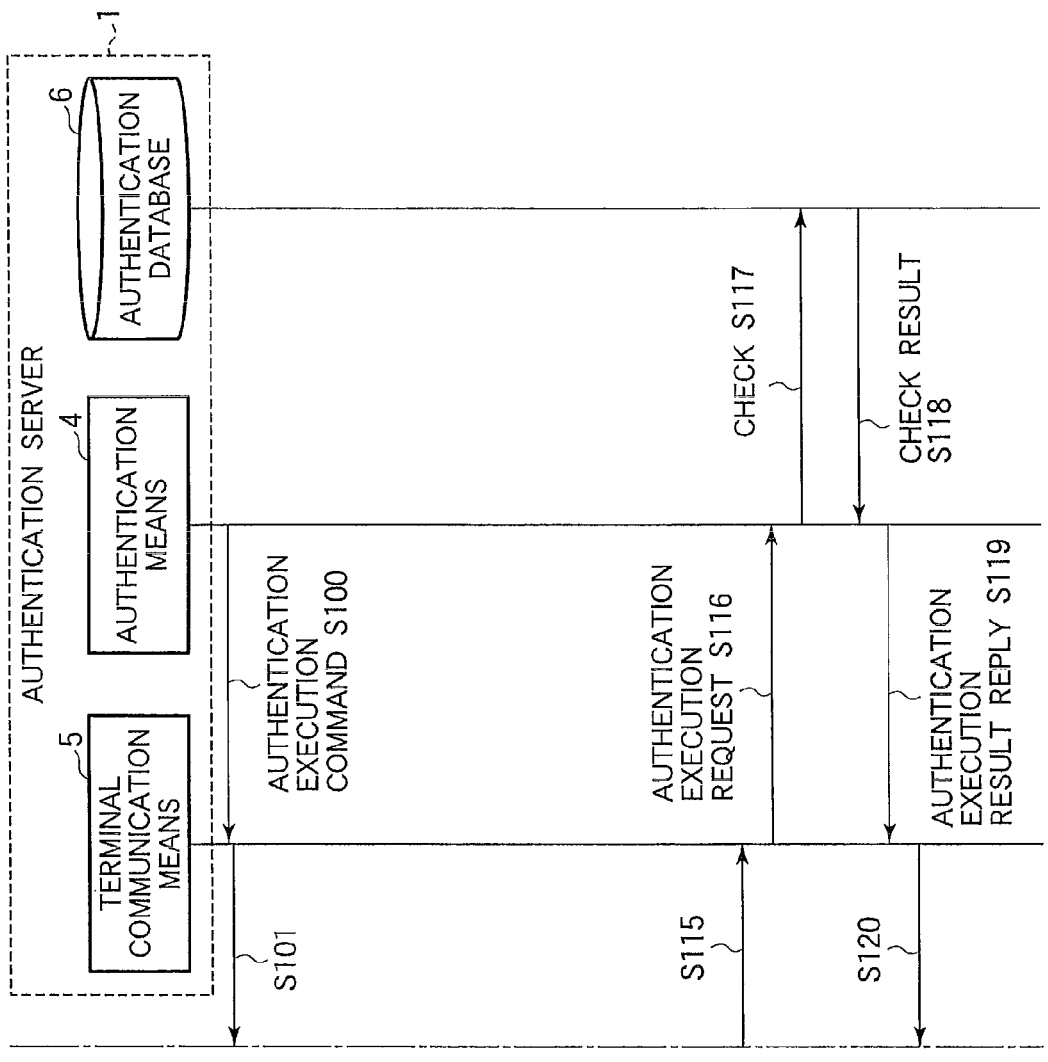

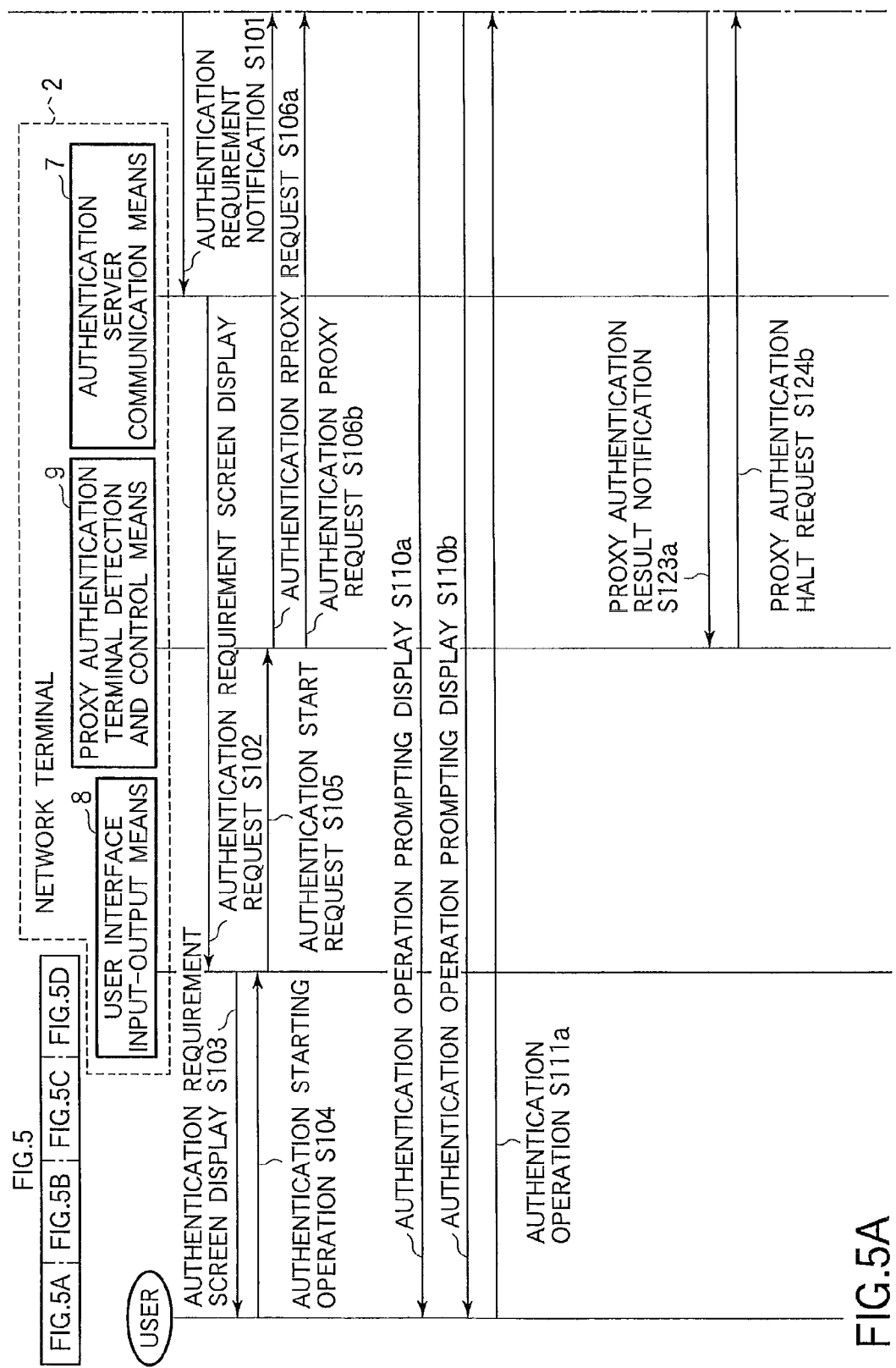

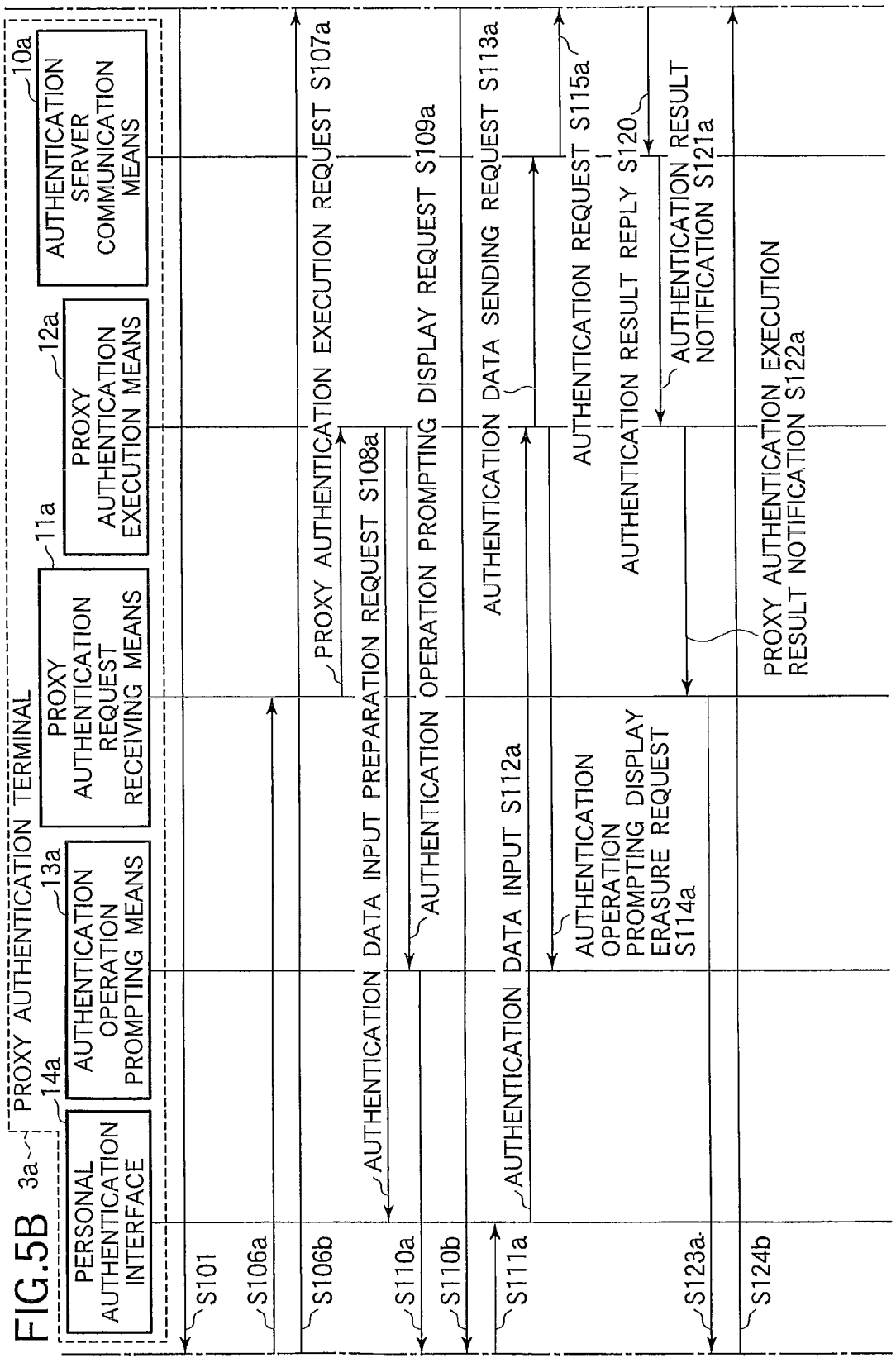

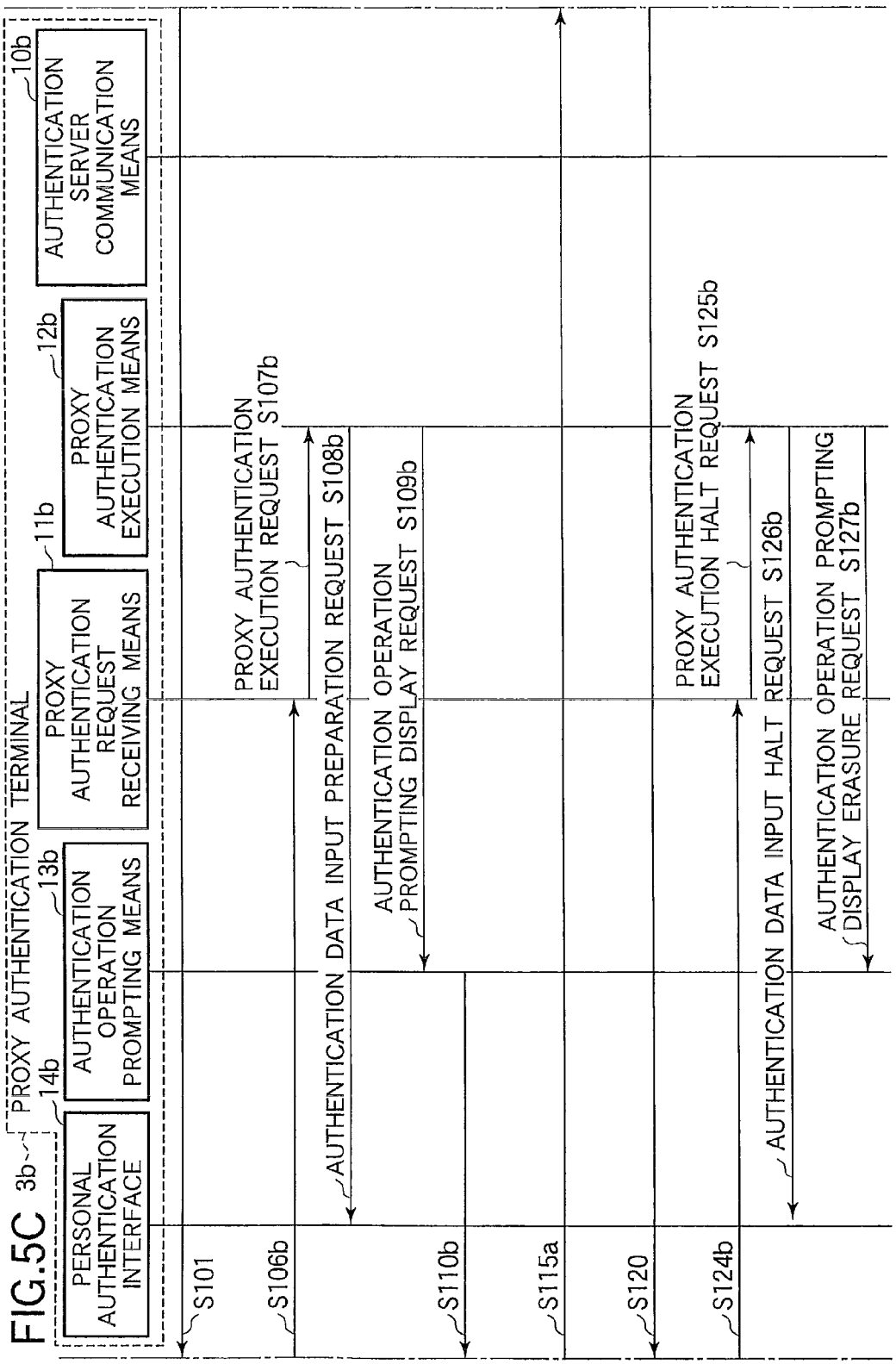

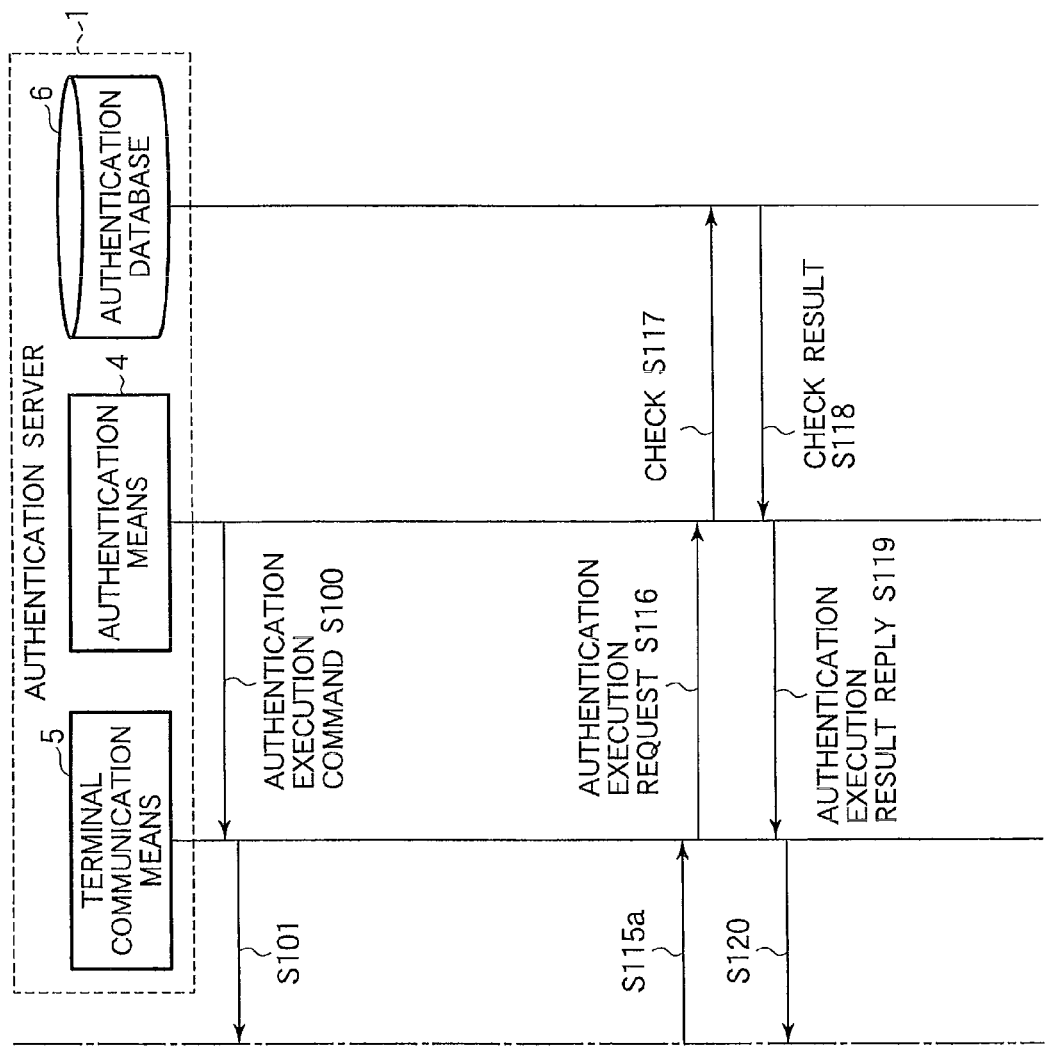

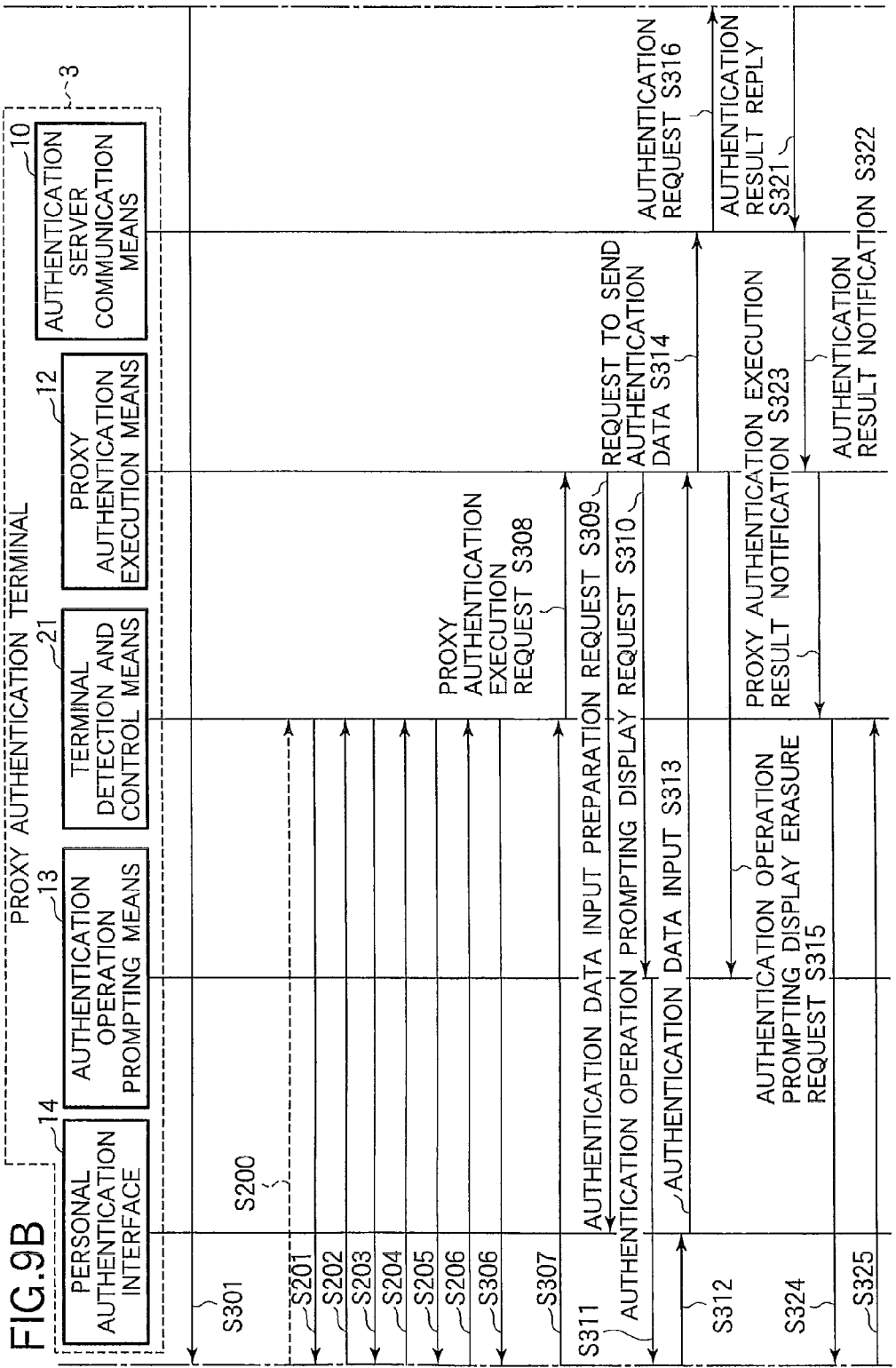

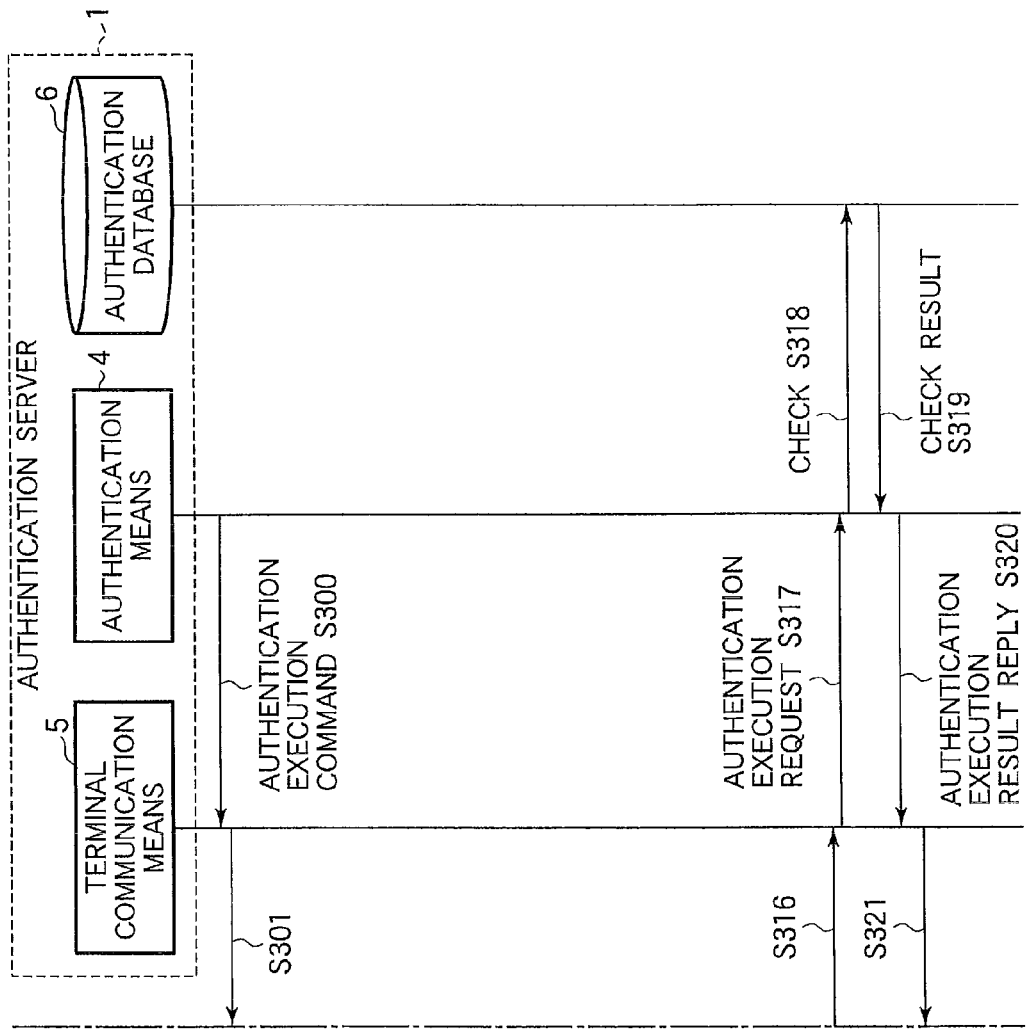

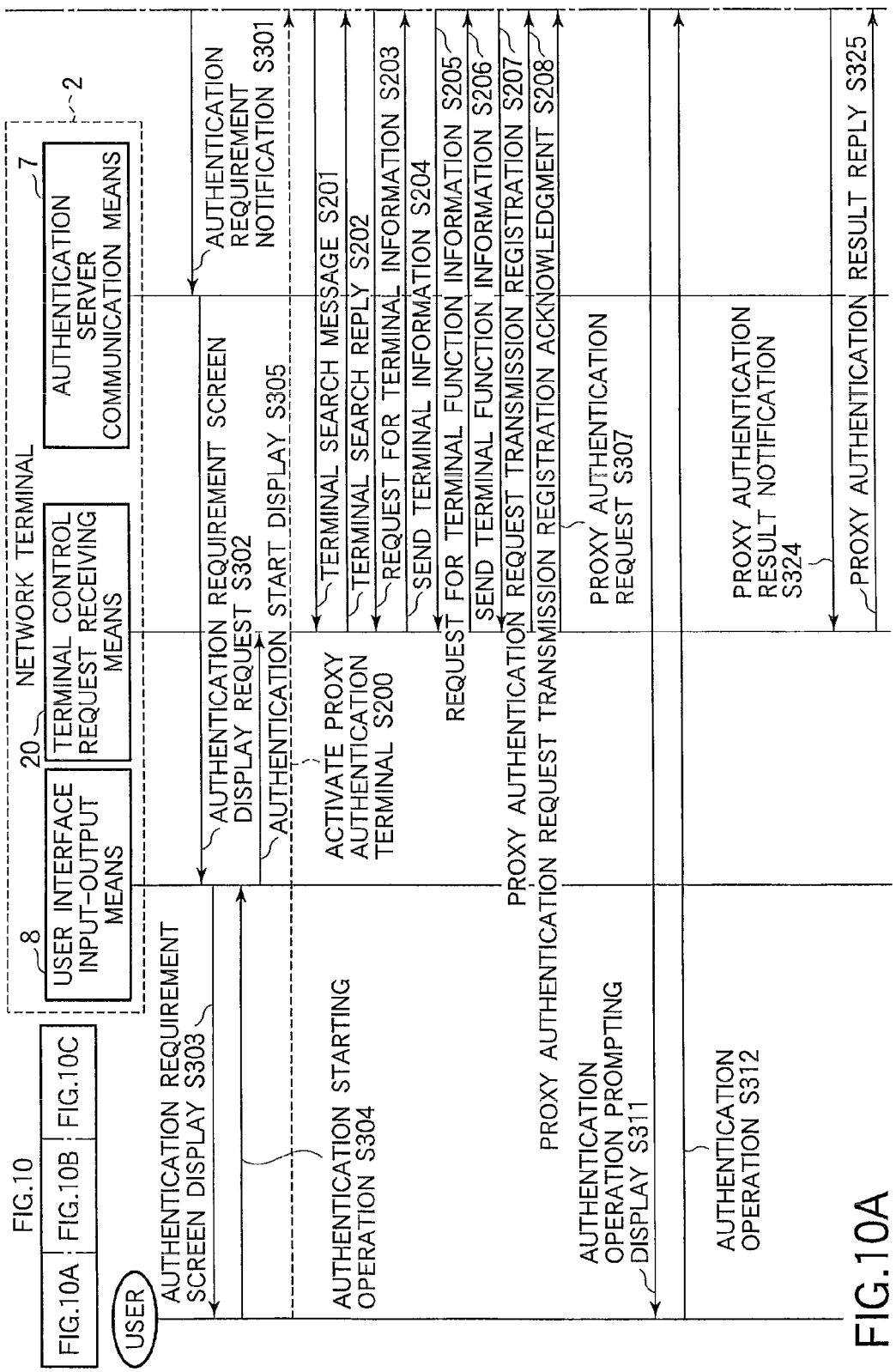

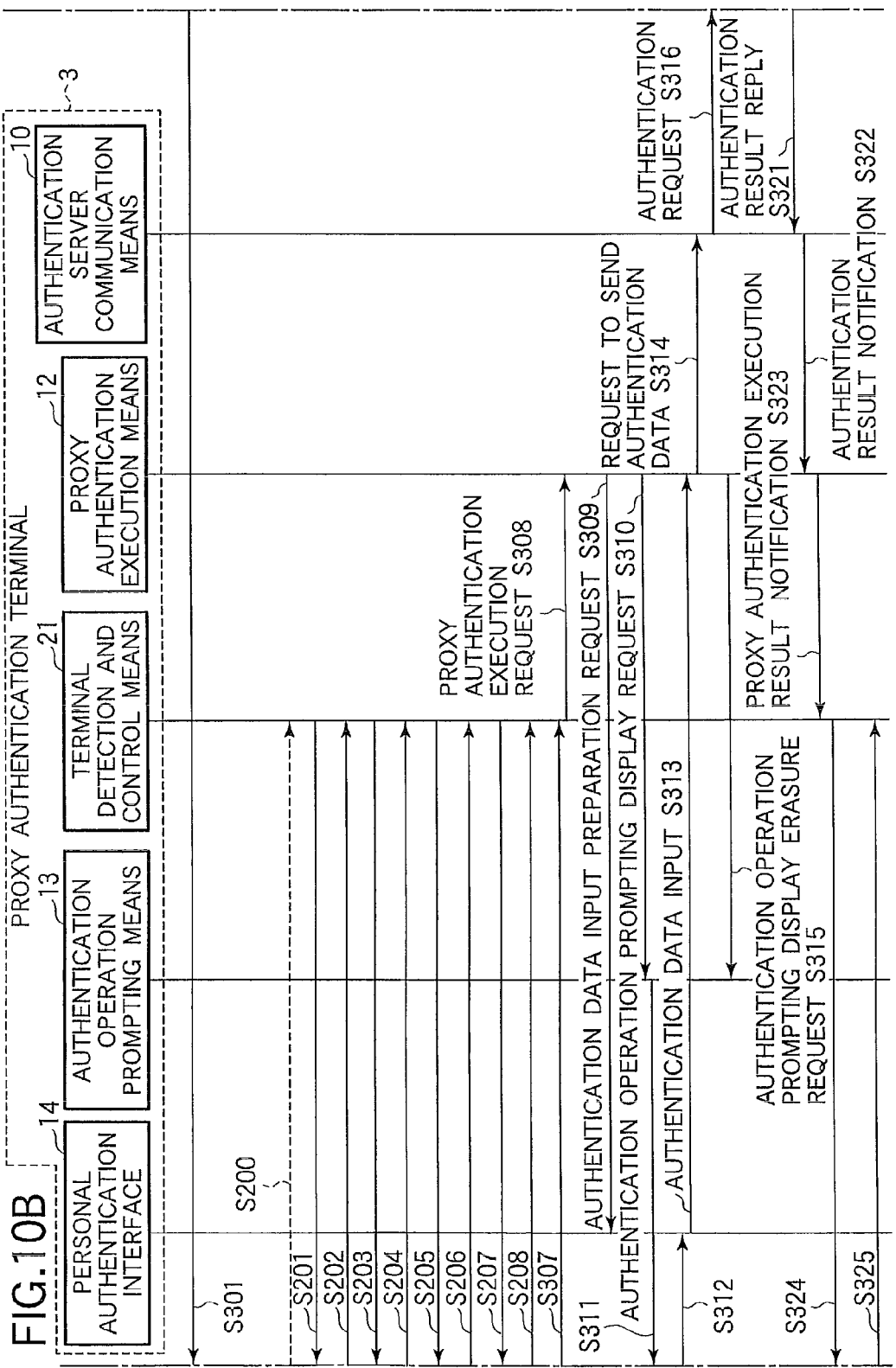

AUTHENTICATION TERMINAL AND NETWORK TERMINAL

FIELD OF THE INVENTION

The present invention relates to a proxy authentication terminal and a network terminal that enable a communication terminal that does not have an interface for performing personal authentication to use a service requiring personal authentication via a network, by enabling the communication terminal to request proxy personal authentication by a terminal having an authentication function and an interface for personal authentication, and enabling personal authentication to be performed by use of the interface of a terminal (the proxy authentication terminal) that receives the request.

BACKGROUND ART

With the spread of the Internet, it has now become possible to receive various services, such as purchasing content and reserving tickets, via networks. These services are of various types, ranging from free services easily accessible by anyone to charged services available exclusively to members. In order to use those services that are provided to specific users, including services exclusive to members, it is necessary to perform personal authentication by using an ID that identifies an individual and authentication information that confirms the identification. Passwords are widely used as authentication information for this purpose. Some types of services may involve users' personal information, in which case biometric, IC-card, or some other type of more advanced authentication information is desirable. When such advanced authentication information is used, a terminal with a special interface for entry of the authentication information becomes necessary. However, the number of home information appliances that are connectable to networks is increasing, and these home information appliances will be increasingly used to access services through networks. A problem that arises in this situation is that home information appliances typically have user interfaces inferior to those of personal computers, so it takes more time and effort to enter authentication information for personal authentication through the user interfaces, making the appliances hard to use. Another problem is that if advanced authentication information is used with home information appliances, it becomes necessary to equip all home information appliances with special interfaces for entry of authentication information, which would be impractical for appliances with many cost constraints.

A known solution to this problem, when a server must authenticate a terminal not having any authentication information shared with the server, is for the server to generate authentication image data and send it to the terminal; after the terminal displays the image data, an authentication terminal sharing authentication information with the server captures the image and sends the captured image together with the authentication terminal's authentication information to the server; the server analyzes the received information, checking that the information includes the image data the server generated itself and the authentication information that should be held by the authentication terminal, thereby enabling authentication of the terminal that had no authentication information (see, for example, Patent Document 1).

Patent Document 1: Japanese Patent Application Publication No. 2005-78371 (pp. 7-8, FIG. 1)

DISCLOSURE OF THE INVENTION

Problems to be Solved by the Invention

With the solution described in Patent Document 1 above, however, because there is no directly intersecting link between the network to which the terminal lacking authentication information is connected and the network to which the terminal having authentication information is connected, it is necessary to use non-network means, such as image capture by a camera, infrared communication, or the like to exchange image data between the two terminals. This exchange of data requires time and effort, and if both terminals are installed in fixed locations, it may be difficult to move them so that the data exchange can take place.

Means of Solution of the Problems

The inventive authentication terminal, being contrived to solve the foregoing problems, includes:

an authentication server communication means for communicating with an authentication server that performs personal authentication via a network;

a terminal communication means for receiving a proxy authentication request from a network terminal lacking an interface for reading authentication data for performing personal authentication, and returning a reply to the network terminal;

an interface for reading authentication data for performing personal authentication;

a proxy authentication execution means for reading the authentication data from the interface in response to the proxy authentication request from the network terminal; and an authentication operation prompting means for prompting a user to perform an authentication operation;

in response to the proxy authentication request from the network terminal, a display prompting the user to perform the authentication operation is displayed, the authentication data for performing personal authentication are read when the user performs the operation, an authentication request is sent, together with the read authentication data, to the authentication server, an authentication result is received from the authentication server, and the network terminal is notified of the result,

Effect of the Invention

An effect of this invention is that, being configured so that when a service requiring personal authentication is used, via a network, a request for proxy personal authentication is made from a network terminal lacking an interface for performing personal authentication to an authentication function equipped terminal having an interface for performing personal authentication, the invention permits access to a service requiring personal authentication from a network terminal lacking an interface for performing personal authentication.

BRIEF DESCRIPTION OF THE DRAWINGS

FIG. 2 is a sequence diagram illustrating a procedure by which a network terminal automatically detects an authentication terminal in the first embodiment of the invention.

FIG. 3 is a sequence diagram illustrating a procedure by which the authentication terminal notifies the network terminal of its presence in the first embodiment of the invention.

FIG. 5 is a sequence drawing illustrating an authentication procedure when there are a plurality of authentication terminals in the first embodiment of the invention.

Figure 1:
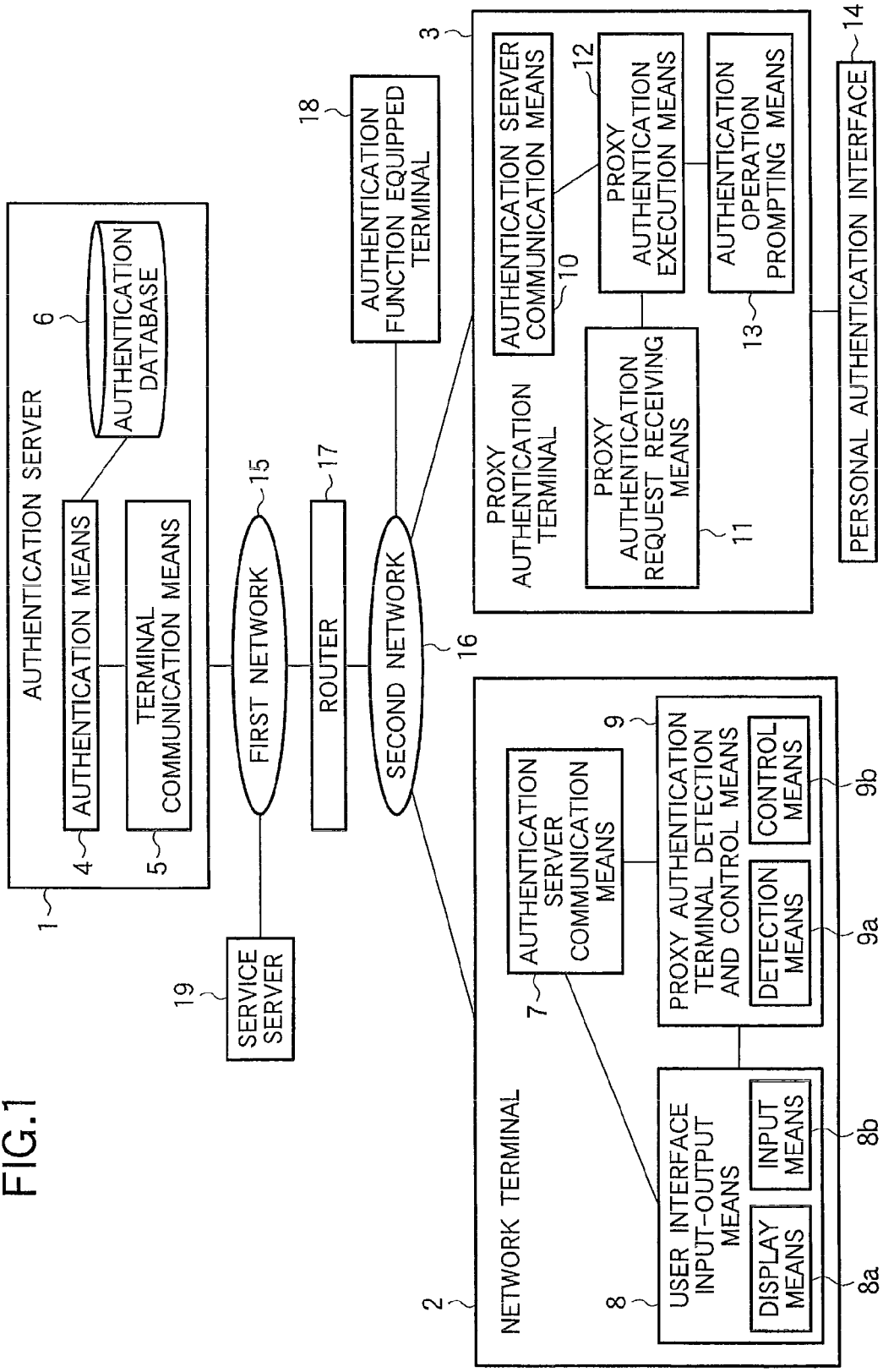
FIG. 1 is a drawing illustrating a system according to a first embodiment of the invention.

EXPLANATION OF REFERENCE CHARACTERS 1 authentication server, 2 network terminal, 3 proxy authentication terminal, 4 authentication means, 5 terminal communication means, 6 authentication database, 7 authentication server communication means, 8 user interface input-output means, 9 proxy authentication terminal detection and control means, 10 authentication server communication means, 11 proxy authentication request receiving means, 12 proxy authentication execution means, 13 authentication operation prompting means, 14 personal authentication interface, 15 first network, 16 second network, 17 router, 20 terminal control request receiving means, 21 terminal detection and control means

BEST MODE FOR CARRYING OUT THE INVENTION

First Embodiment

FIG. 1 is a diagram illustrating a system according to the first embodiment of the invention.

The authentication server 1 carries out personal authentication via a network for a network terminal 2 or an authentication function equipped terminal 3 or 18.

The authentication server 1 has a terminal communication means 5 for communicating with the network terminal 2 or authentication function equipped terminal 3 or 18.

The authentication server 1 also has an authentication database 6 for storing a plurality of personal authentication information as a database, and an authentication means 4 for carrying out authentication by checking personal authentication information obtained from the authentication function equipped terminal 3 or 18 via the terminal communication means 5 against the authentication information registered in the authentication database 6.

The network terminal 2 receives a service that requires personal authentication via a network, and has an authentication server communication means 7, a user interface input-output means 8, and a proxy authentication terminal detection and control means 9.

The authentication server communication means 7 communicates with the authentication server 1.

The network terminal 2 lacks an interface that is necessary for receiving personal authentication (an interface for reading authentication data for performing personal authentication, such as an interface equivalent to the personal authentication interface 14 in the proxy authentication terminal 3A described later, for example). The interface for personal authentication referred to herein is an interface for a contactless smart card or other electronic device that stores authentication data, or an interface for biometric authentication.

The purpose of the proxy authentication terminal detection and control means 9 is to automatically detect, among the authentication function equipped terminals 3, 18, the presence of an authentication function equipped terminal 3 (also referred to simply as a proxy authentication terminal) that can perform proxy authentication for other terminals, and send the proxy authentication terminal 3 a request to perform proxy authentication; the proxy authentication terminal detection and control means 9 functions as a detection means 9a that automatically detects the proxy authentication terminal 3 and as a control means 9b that sends a proxy authentication request to the proxy authentication terminal 3 and receives a response containing the authentication result from the proxy authentication terminal 3.

The purpose of the user interface input-output means 8 is to display a message prompting a user to begin an operation for personal authentication on the proxy authentication terminal 3, and is used by the user to perform an operation acknowledging the message. The user interface input-output means 8 functions as a display means 8a for indicating to the user that personal authentication is necessary, and as an input means 8b which the user uses to begin the operation for personal authentication.

The user interface input-output means 8 may be, for example, the same monitor and input device, such as a pointing device, that the network terminal 2 uses to receive services. When the authentication server communication means 7 and the proxy authentication terminal detection and control means 9 communicate with the outside world, they may use the same network interface (not shown).

The proxy authentication terminal 3 can perform personal authentication in response to a request from another terminal, such as network terminal 2, which lacks an interface for reading authentication data, for example, and has an authentication server communication means 10, a proxy authentication request receiving means 11, a proxy authentication execution means 12, an authentication operation prompting means 13, and a personal authentication interface 14.

The authentication server communication means 10 communicates with the authentication server 1.

The proxy authentication request receiving means 11 receives proxy authentication requests from the network terminal 2.

The proxy authentication execution means 12 performs proxy authentication in response to the proxy requests received by the proxy authentication request receiving means 11.

The authentication operation prompting means 13 prompts the user to begin an authentication operation.

The personal authentication interface 14 reads information for performing personal authentication. The personal authentication interface 14 referred to herein is an interface for a contactless smart card or other electronic device that stores authentication data, or an interface for biometric authentication.

When the authentication server communication means 10 and the proxy authentication request receiving means 11 communicate with the outside world, they may use the same network interface (not shown).

The authentication server 1 is connected to a first network 15; both the network terminal 2 and the proxy authentication terminal 3 are connected to a second network 16. The first network 15 and the second network 16 are interconnected via a router 17. A service server 19 that provides a service to the network terminal 2 is connected to the first network 15; in response to a service request from the network terminal 2, the service server 19 requests personal authentication of the network terminal 2 by the authentication server.

The authentication server 1 has an authentication means 4, a terminal communication means 5, and an authentication database 6.

The operation of the first embodiment will be described below. The first embodiment will be described on the assumption that both the first network 15 and second network 16 are IP networks. The setting of IP addresses in this case may be performed manually by the users or automatically by use of the dynamic host configuration protocol (DHCP), AUTO-IP, or other means.

FIG. 2 illustrates a procedure in which the network terminal 2 detects the proxy authentication terminal 3 and prepares for control. It is assumed that IP addresses have already been assigned to both the network terminal 2 and the proxy authentication terminal 3 when this procedure begins.

In step S1, the proxy authentication terminal detection and control means 9 in the network terminal 2 sends a proxy authentication terminal search message to the second network 16. In this case, the proxy authentication terminal search message is not sent to a specific host device on the second network 16 but is multicast or broadcast so that it is receivable by all host devices on the second network 16.

On reception of the proxy authentication terminal search message, the proxy authentication request receiving means 11 in the proxy authentication terminal 3 sends a proxy authentication terminal search reply to the network terminal 2 in step S2. The contents of the proxy authentication terminal search reply include an ID that indicates that the sender of the message is the proxy authentication terminal 3, the model name and manufacturer name of the proxy authentication terminal 3, and information for obtaining information (referred to below as terminal information) about its available functions. The information for obtaining the terminal information includes a uniform resource locator (URL) used to refer to a file in which information including the model name, manufacturer name, and available functions are described.

On reception of the proxy authentication terminal search reply, the proxy authentication terminal detection and control means 9 in the network terminal 2 sends a request to obtain proxy authentication terminal information to the proxy authentication terminal 3 in step S3.

When it receives the request to obtain proxy authentication terminal information, the proxy authentication request receiving means 11 sends the proxy authentication terminal information to the network terminal 2 in step S4. In one exemplary method of operation in steps S3 and S4, a request to obtain terminal information is sent to the URL that the network terminal 2 obtained as information for obtaining the terminal information, and the file containing the terminal information is obtained in response. Among the data contained in the terminal information, the information about available functions includes information for obtaining names indicating the available functions, IDs indicating the functions, and information indicating details of the functions (referred to below as functional information). The information for obtaining the functional information is a URL or the like for referring to a file containing the interface information of a group of commands for using the functions.

Next, the proxy authentication terminal detection and control means 9 in the network terminal 2 sends a request to obtain proxy authentication functional information to the proxy authentication terminal 3 in step S5.

When the proxy authentication request receiving means 11 in the proxy authentication terminal 3 receives the request to obtain proxy authentication functional information, it sends the proxy authentication functional information to the network terminal 2 in step S6. As a result, it becomes possible for the network terminal 2 to take control by sending commands to the proxy authentication terminal 3.

FIG. 3 illustrates a preparatory procedure used when the proxy authentication terminal 3 joins the network after the network terminal 2. In this case, the proxy authentication request receiving means 11 in the proxy authentication terminal 3 sends a proxy authentication terminal presence notification to the second network 16 in step S2*b*. Like the proxy authentication terminal search message, the proxy authentication terminal presence notification sent at this time is sent by multicast or broadcast transmission, as a message receivable by all host devices on the second network 16. The contents of the proxy authentication terminal presence notification include information for obtaining terminal information, as in the proxy authentication terminal search reply. Step S3 and the following steps are similar to the procedure described with reference to FIG. 2, and accordingly, at the completion of step S6, it becomes possible for the network terminal 2 to take control by sending commands to the proxy authentication terminal 3.

Next, a proxy authentication procedure will be described with reference to FIG. 4. This procedure assumes that the procedure described with reference to FIG. 2 or 3 has been completed. Device authentication of the network terminal 2 and the proxy authentication terminal 3 by the authentication server 1 and (mutual) device authentication between the network terminal 2 and proxy authentication terminal 3 have been also completed. As a result of a request for provision of a service requiring personal authentication made by the network terminal 2 to the service server 19, the service server 19 makes a request to the authentication server 1 for personal authentication of the network terminal 2.

The authentication means 4 in the authentication server 1 sends an authentication execution command to the terminal communication means 5 in step S100.

On reception of the authentication execution command in step 101, the terminal communication means 5 sends an authentication requirement notification to the network terminal 2 in step S101. The authentication requirement notification includes an authentication ID generated at the authentication server 1.

On receiving the authentication requirement notification, the authentication server communication means 7 in the network terminal 2 sends an authentication requirement screen display request to the user interface input-output means 8 in step S102.

On reception of the authentication requirement screen display request, the user interface input-output means 8 performs a display prompting the user to start a personal authentication operation in step S103. This display is realized, for example, as a GUI screen displaying a message stating that personal authentication is necessary and a 'start authentication' button that the user clicks to start the authentication operation.

The user sees the screen, learns that personal authentication is necessary, and performs the authentication starting operation by clicking the 'start authentication' button in step S104, or by other means.

The user interface input-output means 8 detects the authentication starting operation by the user and sends an authentication start request to the proxy authentication terminal detection and control means 9 in step S105.

On receiving the authentication start request, the proxy authentication terminal detection and control means 9 sends a proxy authentication request message to the proxy authentication terminal in step S106. The proxy authentication request message includes an ID (referred to below as a requesting terminal ID) identifying the terminal that made the proxy authentication request and the authentication ID passed from the authentication server 1 to the network terminal 2 (received from the authentication server 1) in step S101.

On reception of the proxy authentication request, the proxy authentication request receiving means 11 in the proxy authentication terminal 3 sends a proxy authentication execution request to the proxy authentication execution means 12 in step S107.

In step S108, the proxy authentication execution means 12 sends an authentication data input preparation request to the personal authentication interface 14. After receiving the authentication data input preparation request, the personal authentication interface 14 stands by in readiness to read authentication data.

In step S109, the proxy authentication execution means 12 concurrently sends the authentication operation prompting means 13 an authentication operation prompting display request requesting a display for prompting the user to perform the authentication operation.

Having received the authentication operation prompting display request, in step S110 the authentication operation prompting means 13 performs a display to prompt the user to perform a personal authentication operation. The display is performed by an appropriate method depending on the user interface device provided in the proxy authentication terminal. In one exemplary method, a message is displayed on a liquid crystal screen.

Heeding the display, the user performs the authentication operation on the personal authentication interface 14 in step S111. If a contactless smart card is used for this operation, for example, the personal authentication interface 14 reads authentication data when the contactless smart card is held over the personal authentication interface 14.

After completing the reading of the data, in step S112 the personal authentication interface 14 informs the proxy authentication execution means 12 of the authentication data by sending an authentication data input message including the authentication data it has read.

In step S113, the proxy authentication execution means 12 sends the authentication server communication means 10 a request to send authentication data including the input authentication data together with the requesting terminal ID and the authentication ID.

Concurrently, in step S114, the proxy authentication execution means 12 sends the authentication operation prompting means 13 an authentication operation prompting display erasure request to erase the display prompting the user to perform the authentication operation.

In step S115, the authentication server communication means 10 sends an authentication request message to the authentication server 1. The authentication request message includes the authentication data, requesting terminal ID, and authentication ID.

Upon receiving the authentication request, in step S116 the terminal communication means 5 in the authentication server 1 sends the authentication means 4 an authentication execution request including the authentication data, requesting terminal ID, and authentication ID.

From the content of the received requesting terminal ID and authentication ID, the authentication means 4 checks that this authentication request is for proxy authentication corresponding to the authentication execution command that the authentication means 4 itself issued in step S100. If the result matches (when the authentication ID that the authentication server generated in step S100 matches the authentication ID included in the authentication execution request that the authentication server received in step S116), the authentication means 4 checks the received authentication data against the registered user authentication data stored in the authentication database 6 in step S117, and receives the result of this check in step S118.

Based on the result of this check, in step S119 the authentication means 4 sends the terminal communication means 5 an authentication execution result reply including the authentication execution result and authentication completion information. The authentication completion information described herein is, for example, an HTTP cookie or the like.

On receiving the authentication execution result reply, the terminal communication means 5, in step S120, sends the proxy authentication terminal 3 an authentication result reply including the authentication result and authentication completion information.

On receiving the authentication result reply, the authentication server communication means 10 in the proxy authentication terminal 3, in step S121, sends the proxy authentication execution means 12 an authentication result notification including the authentication result and authentication completion information.

On receiving the authentication result notification, the proxy authentication execution means 12, in step S122, sends the proxy authentication request receiving means 11 a proxy authentication execution result notification including the authentication result and authentication completion information.

On receiving the proxy authentication execution result notification, the proxy authentication request receiving means 11, in step S123, sends the network terminal 2 a proxy authentication result notification including the authentication result, for the purpose of notification of the result of the proxy authentication.

On receiving the proxy authentication result notification, the network terminal 2 resumes service usage processing, depending on the result. For example, if authentication succeeded, the network terminal 2 makes another service provision request to the service server 19; if authentication failed, the network terminal 2 performs other processing, such as canceling the service provision request.

The description above assumes that the procedure described in FIGS. 2 and 3 has been completed. If the procedure described in FIGS. 2 and 3 has not been completed, the operation can be implemented as follows. If the proxy authentication terminal detection and control means 9 receives an authentication start request in step S105 before it has detected the proxy authentication request receiving means 11 in the proxy authentication terminal 3, it waits for a prescribed time interval before proceeding to step S106; if the proxy authentication terminal detection and control means 9 detects the proxy authentication request receiving means 11 in the proxy authentication terminal 3 during this time interval, it sends a proxy authentication request message to the proxy authentication terminal; otherwise, it times out and halts the operation.

So far, the operation when there is only a single proxy authentication terminal 3 has been described with reference to FIG. 4, but in practical networks, a user may have a plurality of proxy authentication terminals. In this case, which proxy authentication terminal the user uses depends on the situation. The operation when there are a plurality of proxy authentication terminals will be described below with reference to FIG. 5. FIG. 5 illustrates the procedure when there are two proxy authentication terminals 3a and 3b. In order to distinguish the two proxy authentication terminals 3a and 3b, the letter a is suffixed to the reference characters of the components of proxy authentication terminal 3a and the letter b is suffixed to the reference characters of the components of proxy authentication terminal 3b.

This procedure assumes that the procedure described in FIGS. 2 and 3 has been completed.

It is also assumed that device authentication of the network terminal 2 and proxy authentication terminals 3a and 3b by the authentication server 1, device authentication (mutual authentication) between the network terminal 2 and proxy authentication terminal 3a, and device authentication (mutual authentication) between the network terminal 2 and proxy authentication terminal 3b have been completed.

Figure 4A:
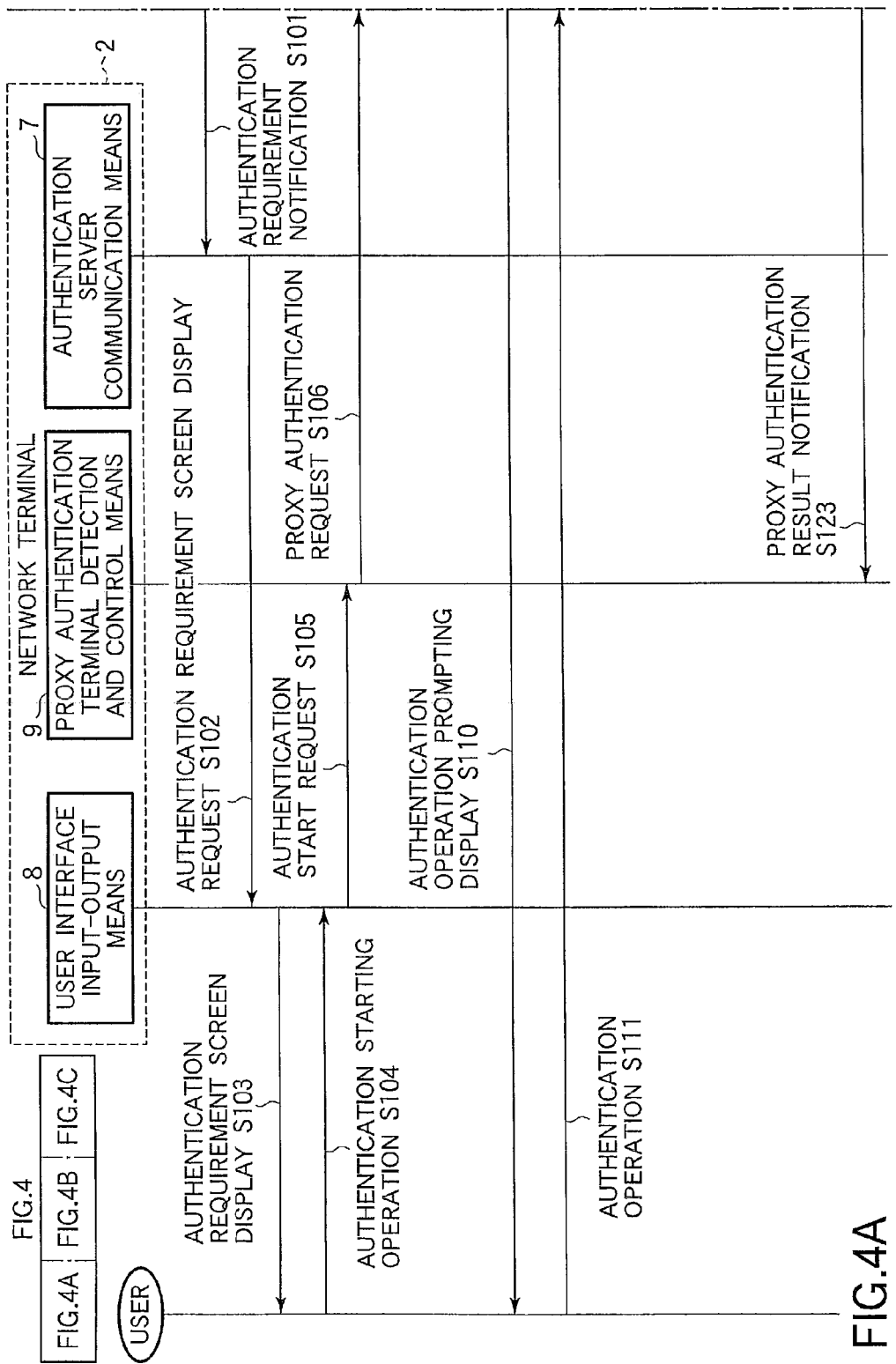
FIG. 4 is a sequence drawing illustrating an authentication procedure in the first embodiment of the invention.

Operations identical to operations described with reference to FIG. 4 are indicated by the same reference characters. The operations of the proxy authentication terminals 3a and 3b are distinguished by suffixing the letters a and b to step numbers related to proxy authentication terminals 3a and 3b, respectively.

The operations from steps S100 to step S105, which take place as a result of a request made by the network terminal 2 to the service server 19 for provision of a service requiring personal authentication, are as described in FIG. 4.

On receiving the authentication start request, the proxy authentication terminal detection and control means 9 sends a proxy authentication request message to all currently detected proxy authentication terminals (proxy authentication terminals 3a and 3b in this drawing) in step S106 (S106a and S106b).

On receiving the proxy authentication request, the proxy authentication terminals 3a and 3b perform the operations from steps S107a to S110a and the operations from step S107b to S110b, respectively.

As a result, the respective personal authentication interfaces 14a and 14b of the proxy authentication terminals 3a and 3b stand by, ready to read authentication data at any time.

The authentication operation prompting means 13a and 13b of the proxy authentication terminals 3a and 3b perform displays to prompt the user to perform operations for personal authentication.

As a result, it becomes possible for the user to perform authentication operations by using both the proxy authentication terminals 3a and 3b. If the user selects use of proxy authentication terminal 3a, the user performs an authentication operation on personal authentication interface 14a according to the display on proxy authentication terminal 3a. The steps from S112a to S123a include the same operations as with a single proxy authentication terminal, described with reference to FIG. 4.

On receiving a proxy authentication result notification in step S123a, the network terminal 2 resumes service usage processing, depending on the result, and the proxy authentication terminal detection and control means 9 sends a proxy authentication halt request to proxy authentication terminal 3b in step S124b.

On receiving the proxy authentication halt request, proxy authentication request receiving means 11b sends a proxy authentication execution halt request to proxy authentication execution means 12b in step S125b.

On receiving the proxy authentication execution halt request, proxy authentication execution means 12b, in step S126b, sends an authentication data input halt request to personal authentication interface 14b, which is standing by for input of authentication data. As a result, personal authentication interface 14b is released from the standby state.

Proxy authentication execution means 12b concurrently sends an authentication operation prompting display erasure request in step S127 to authentication operation prompting means 13b, which is continuing the display that prompts the user to perform an operation for personal authentication. On receiving the authentication operation prompt display erasure request, authentication operation prompting means 13b erases the display. The above description assumes use of two proxy authentication terminals, but when there are three or more proxy authentication terminals, similar operations can be carried out by executing the procedures from steps S106b to S109b and steps from S124b to S127b on the third and further proxy authentication terminals.

An effect produced by this embodiment is that it enables access to a service requiring personal authentication from a network terminal lacking an interface for personal authentication, because when a service requiring personal authentication is used, via a network, a request for proxy authentication can be made from a network terminal lacking an interface for personal authentication to a proxy authentication terminal having an interface for personal authentication, whereby the interface of the proxy authentication terminal can be used to perform personal authentication. Another effect is that it enables the user to use any proxy authentication terminal freely to perform personal authentication, because a request for proxy authentication is made by the network terminal to all detected proxy authentication terminals and a proxy authentication halt request is sent to all the authentication terminals except the one that returns a reply including the authentication result.

Second Embodiment

Figure 6:
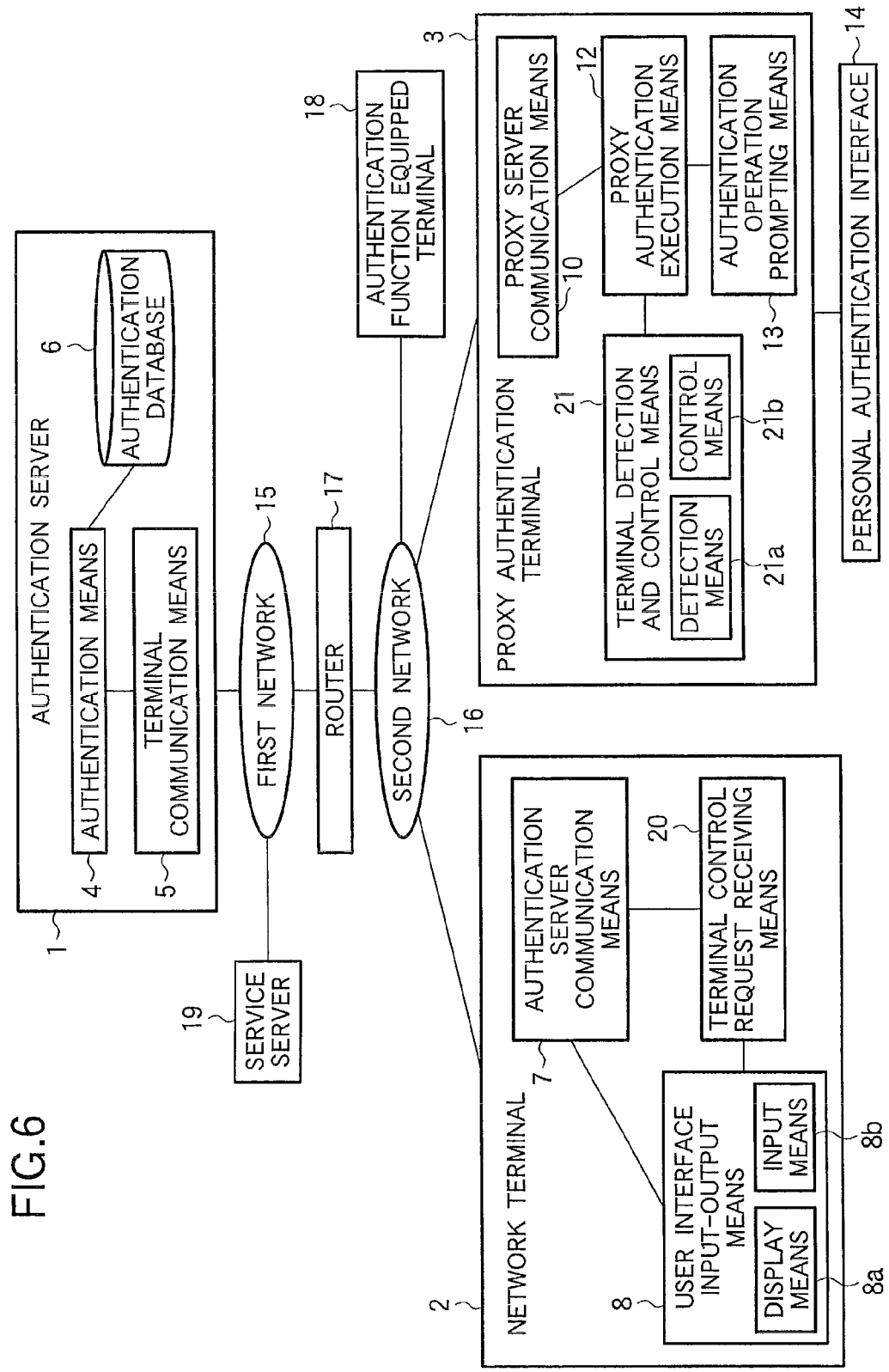
FIG. 6 is a drawing illustrating a system according to a second embodiment of the invention.

FIG. 6 is a diagram illustrating a system according to the second embodiment of the invention. The differences from the structure shown in FIG. 1 described in the first embodiment are that the proxy authentication terminal detection and control means 9 in the network terminal 2 is replaced by a terminal control request receiving means 20 and that the proxy authentication request receiving means 11 in the proxy authentication terminal 3 is replaced by a terminal detection and control means 21.

The terminal control request receiving means 20 exchanges control information about proxy authentication with the proxy authentication terminal 3.

The terminal detection and control means 21 exchanges control information about proxy authentication with the network terminal 2, and has both a function as a detection means 21a for automatically detecting a network terminal 2 lacking an interface to read authentication data for performing personal authentication and a function as a communication means 21b for sending a proxy authentication necessity check to the network terminal 2 and receiving a reply from the network terminal 2.

Figure 7:
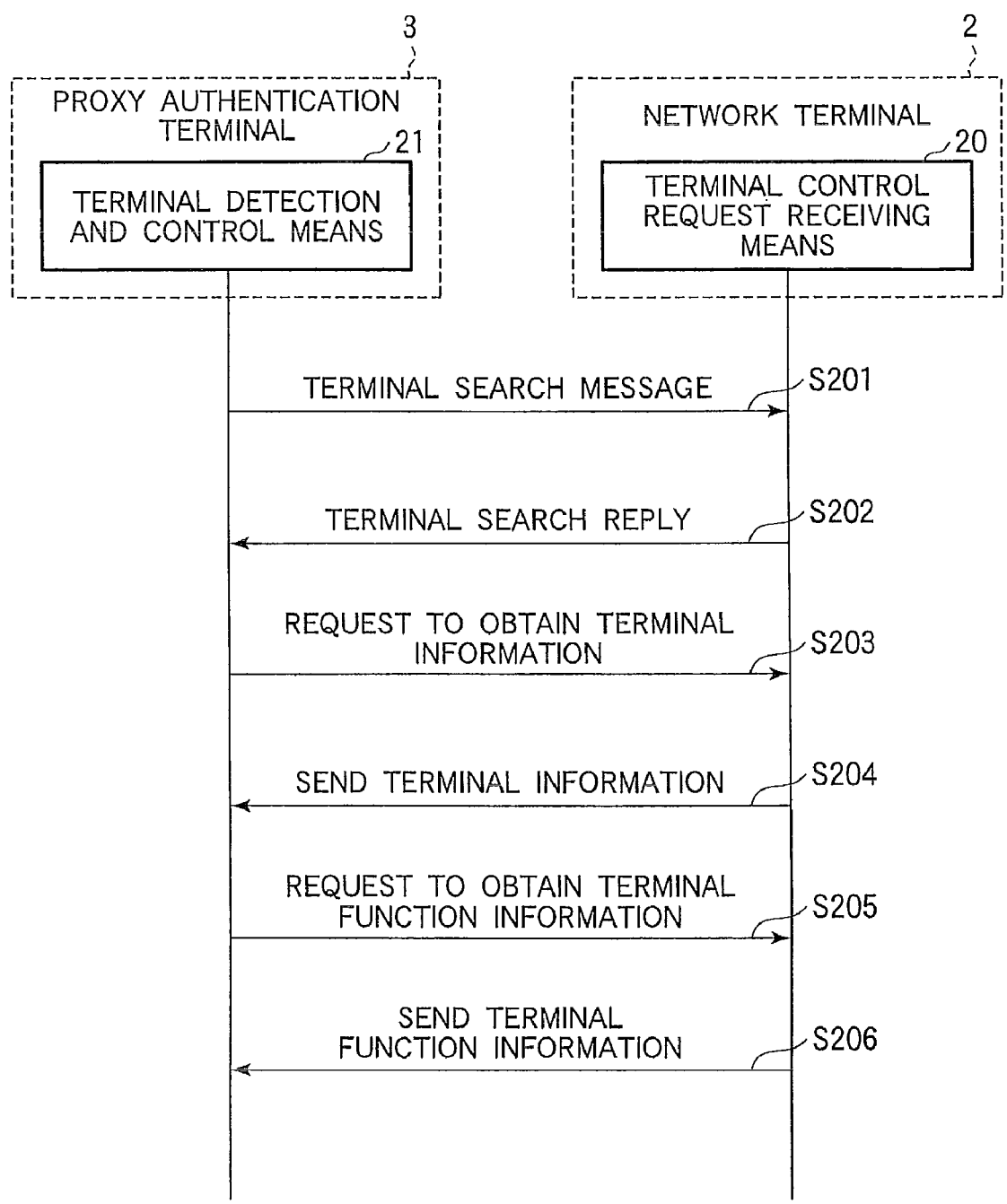
FIG. 7 is a sequence diagram illustrating a procedure by which a network terminal automatically detects an authentication terminal in the second embodiment of the invention.

The operation of the second embodiment will be described below. As in the first embodiment, the second embodiment will be described on the assumption that both the first network 15 and second network 16 are IP networks. The setting of IP addresses in this case may be performed manually by the users or automatically by use of DHCP, AUTO-IP, or other means. FIG. 7 illustrates a procedure in which the proxy authentication terminal 3 detects the network terminal 2 and prepares for control. It is assumed that IP addresses have already been assigned to both the network terminal 2 and the proxy authentication terminal 3 when this procedure begins.

In step S201, the terminal detection and control means 21 in the proxy authentication terminal 3 sends a terminal search message to the second network 16. This terminal search message is not sent to a specific host device on the second network 16 but is multicast or broadcast so that it is receivable by all host devices on the second network 16.

On reception of the terminal search message, the terminal control request receiving means 20 in the network terminal 2 sends a terminal search reply to the proxy authentication terminal 3 in step S202. The contents of the terminal search reply include an ID that indicates that the sender of the message is the network terminal 2, the model name and manufacturer name of the network terminal 2, and information for obtaining information (referred to below as terminal information) about its available functions. The information for obtaining the terminal information includes a uniform resource locator (URL) used to refer to a file in which information including the model name, manufacturer name, and available functions are described.

On reception of the terminal search reply, the terminal detection and control means 21 in the proxy authentication terminal 3 sends a request to obtain terminal information to the network terminal 2 in step S203.

When it receives the request to obtain terminal information, the terminal control request receiving means 20 in the network terminal 2 sends the terminal information to the proxy authentication terminal 3 in step S204. In one exemplary method of operation in steps S203 and S204, a request to obtain terminal information is sent to the URL that the proxy authentication terminal 3 obtained as information for obtaining the terminal information, and a file containing the terminal information is obtained in response. Among the data contained in the terminal information, the information about available functions includes information for obtaining names indicating the available functions, IDs indicating the functions, and information indicating details of the functions (referred to below as functional information). The information for obtaining the functional information is a URL or the like for referring to a file containing the interface information of a group of commands for using the functions.

Next, the terminal control request receiving means 20 in the network terminal 2 sends a request to obtain terminal functional information to the network terminal 2 in step S205.

When the terminal control request receiving means 20 in the network terminal 2 receives the request to obtain terminal functional information, it sends the terminal functional information to the proxy authentication terminal 3 in step S206. As a result, it becomes possible for the proxy authentication terminal 3 to take control by sending commands to the network terminal 2.

Figure 8:
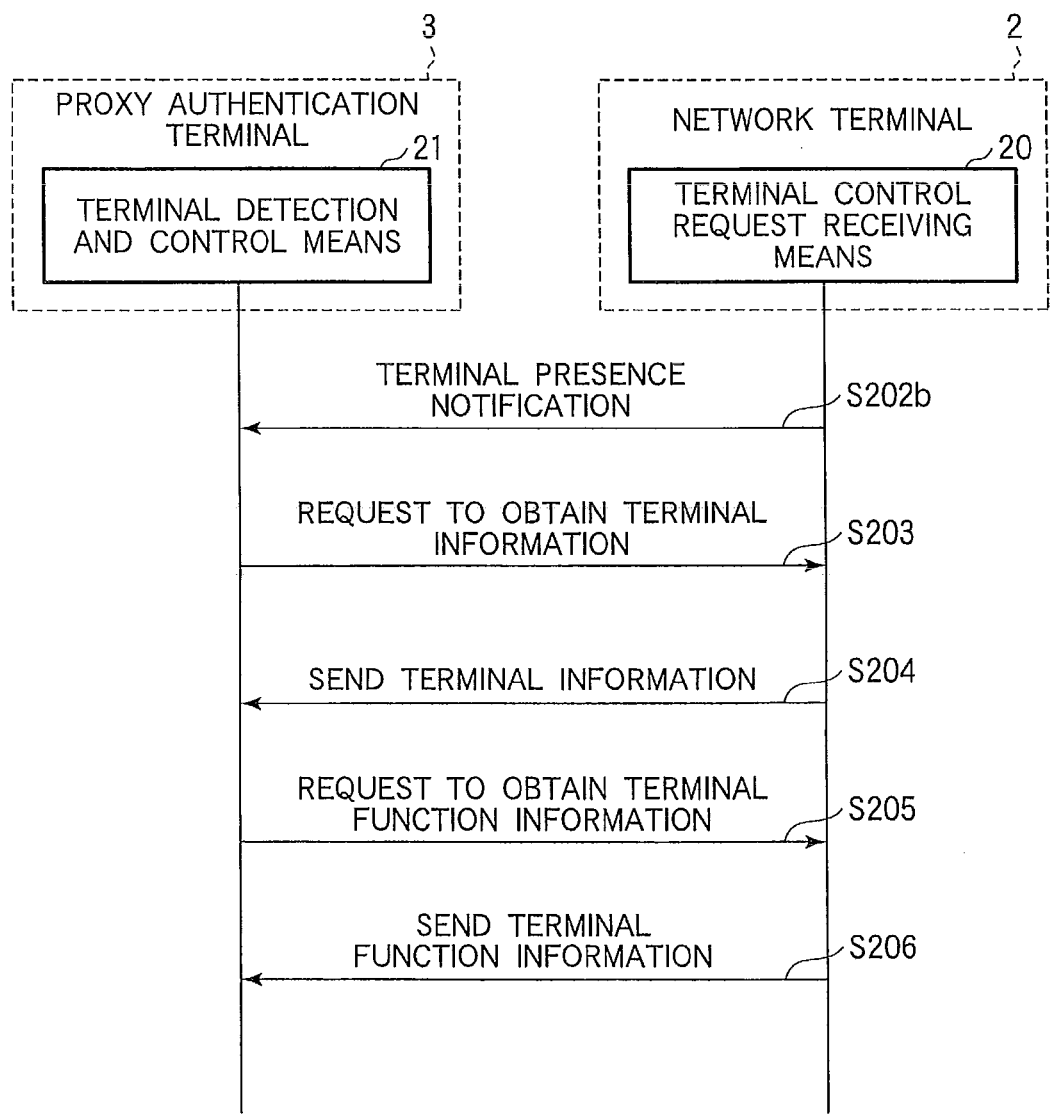
FIG. 8 is a sequence diagram illustrating a procedure by which the authentication terminal notifies the network terminal of its presence in the second embodiment of the invention.

FIG. 8 illustrates a preparatory procedure used when the network terminal 2 joins the network after the proxy authentication terminal 3.

In this case, the terminal control request receiving means 20 in the network terminal 2 sends a terminal presence notification to the second network 16 in step S202b. The terminal presence notification sent at this time is sent, like to the terminal search message, by multicast or broadcast transmission, as a message receivable by all host devices on the second network 16. The contents of the terminal presence notification include, like the contents of a terminal search reply, information for obtaining terminal information. Step S203 and the following steps are similar to the procedure described with reference to FIG. 7, and accordingly, at the completion of step S206, it becomes possible for the proxy authentication terminal 3 to take control by sending commands to the network terminal 2.

Figure 9A:
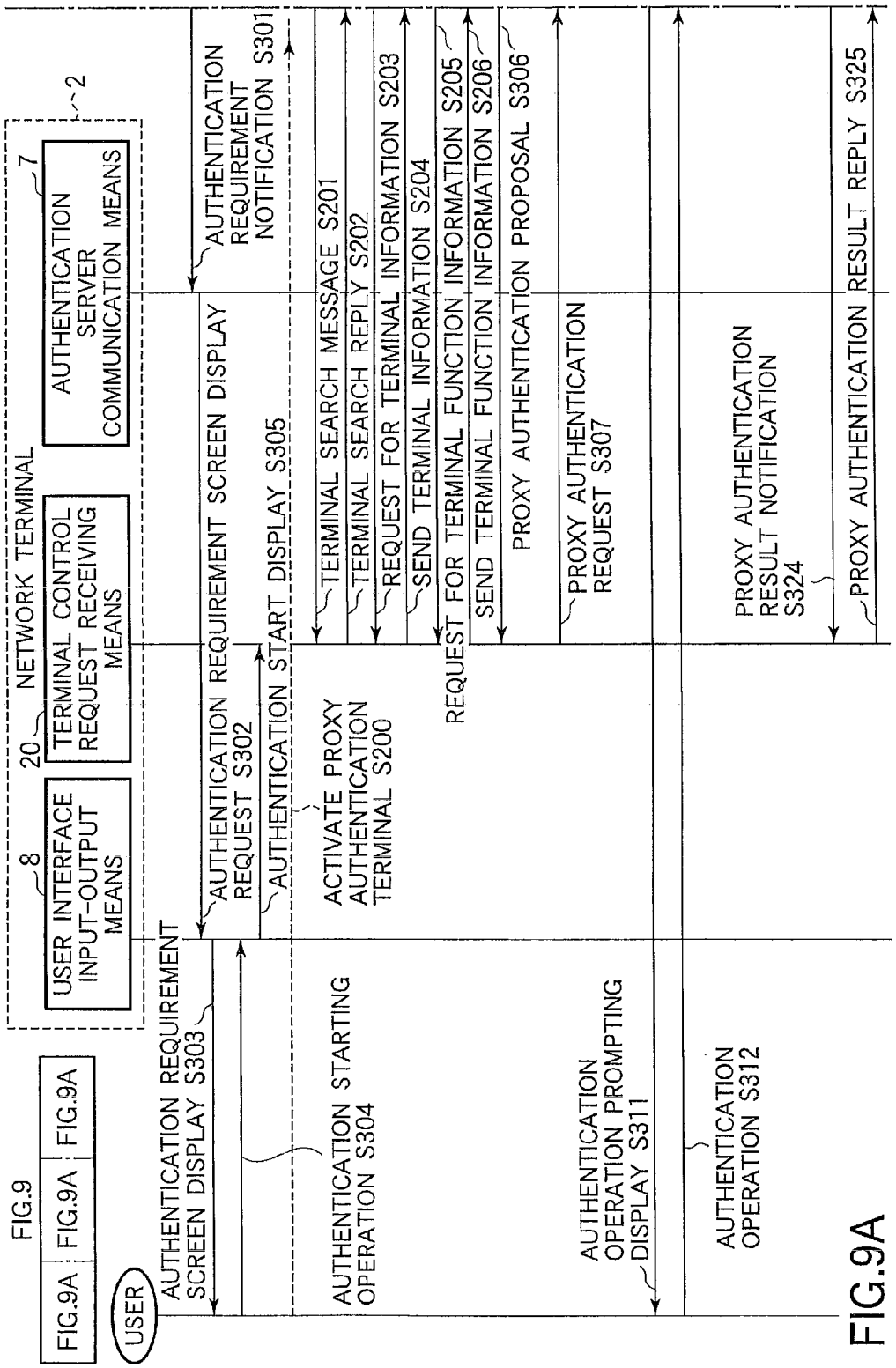
FIG. 9 is a sequence drawing illustrating an authentication procedure in the second embodiment of the invention.

Next, a proxy authentication procedure will be described with reference to FIG. 9. The procedure described here assumes that after starting the authentication operation on the network terminal 2, the user selects an arbitrary proxy authentication terminal 3 and turns on its power. That is, the procedures described with reference to FIGS. 7 and 8 have not been completed when this procedure begins. Device authentication of the network terminal 2 and the proxy authentication terminal 3 by the authentication server 1 and (mutual) device authentication between the network terminal 2 and proxy authentication terminal 3 have been completed. As a result of a request (not shown) for provision of a service requiring personal authentication, made by the network terminal 2 to the service server, the service server 19 makes a request to the authentication server 1 for personal authentication of the network terminal 2.

The authentication means 4 in the authentication server 1 sends an authentication execution command to the terminal communication means 5 in step S300.

On reception of the authentication execution command, the terminal communication means 5 sends an authentication requirement notification to the network terminal 2 in step S301. The authentication requirement notification includes an authentication ID generated at the authentication server.

On receiving the authentication requirement notification, the authentication server communication means 7 in the network terminal 2 sends an authentication requirement screen display request to the user interface input-output means 8 in step S302.

On reception of the authentication requirement screen display request, the user interface input-output means 8 performs a display for prompting the user to start a personal authentication operation in step S303. This display is realized, for example, as a GUI screen displaying a message stating that personal authentication is necessary and a 'start authentication' button that the user clicks to start the authentication operation.

In step S304 the user sees the screen, learns that personal authentication is necessary, and performs the authentication starting operation by clicking the 'start authentication' button, or by other means.

The user interface input-output means 8 detects the authentication starting operation by the user and sends an authentication start request to the terminal detection and control means 21 in step S305. On receiving the authentication start request, the terminal detection and control means 21 transits internally to an 'authentication start requested' state and waits for a command from the proxy authentication terminal 3.

Next, the user activates the proxy authentication terminal 3 in step S200. FIG. 9 shows the user directly activating the terminal detection and control means 21, but in practice the user activates the proxy authentication terminal 3 by pressing its starting switch or performing some other operation, and the terminal detection and control means 21 is activated as a result.

In the course of step S200, the proxy authentication terminal 3 obtains an IP address. After the IP address is obtained, operations similar to the operations from steps S201 to S206 described with reference to FIG. 7 are executed, and as a result it becomes possible for the proxy authentication terminal 3 to take control by sending commands to the network terminal 2.

After this, the terminal detection and control means 21 in the proxy authentication terminal 3 sends a proxy authentication proposal to the network terminal 2 in step S306. On receiving the proxy authentication proposal, the terminal control request receiving means 20 in the network terminal 2 checks whether the terminal control request receiving means 20 itself is in the 'authentication start requested' state, and if in the 'authentication start requested' state, it sends a proxy authentication request message to the proxy authentication terminal in step S307. After this, the terminal control request receiving means 20 transits to the 'now requesting authentication start' state. The proxy authentication request message includes an ID (referred to as the requesting terminal ID below) for identifying the terminal that made the proxy authentication request and the authentication ID passed from the authentication server to the network terminal 2 in step S301.

On reception of the proxy authentication request, the terminal detection and control means 21 in the proxy authentication terminal 3 sends a proxy authentication execution request to the proxy authentication execution means 12 in step S308.

In step S309, the proxy authentication execution means 12 sends an authentication data input preparation request to the personal authentication interface 14. After receiving the authentication data input preparation request, the personal authentication interface 14 stands by in readiness to read the authentication data.

In step S310, the proxy authentication execution means 12 concurrently sends the authentication operation prompting means 13 an authentication operation prompting display request requesting a display for prompting the user to perform the authentication operation.

Having received the authentication operation prompting display request, in step S311 the authentication operation prompting means 13 performs a display prompting the user to perform an operation for personal authentication. The display is the same as in the first embodiment.

Heeding the display, the user performs the authentication operation on the personal authentication interface 14 in step S312. If a contactless smart card is used for this operation, for example, the personal authentication interface 14 reads the authentication data when the contactless smart card is held over the personal authentication interface 14.

After completing the reading of the data, in step S313 the personal authentication interface 14 informs the proxy authentication execution means 12 of the authentication data by sending an authentication data input message including the authentication data it has read.

In step S314, the proxy authentication execution means 12 sends the authentication server communication means 10 a request to send authentication data including the input authentication data together with the requesting terminal ID and the authentication ID.

Concurrently, in step S315, the proxy authentication execution means 12 sends the authentication operation prompting means 13 an authentication operation prompting display erasure request to erase the display prompting the user to perform the authentication operation.

In step S316, the authentication server communication means 10 sends an authentication request message to the authentication server 1. The authentication request message includes the authentication data, requesting terminal ID, and authentication ID.

Upon receiving the authentication request, in step S317 the terminal communication means 5 in the authentication server 1 sends the authentication means 4 an authentication execution request including the authentication requesting terminal ID, and authentication ID. From the content of the received requesting terminal ID and authentication ID, the authentication means 4 checks that this authentication request is for a proxy authentication corresponding to the authentication execution command that the authentication means 4 itself issued in step S300; if the result matches, the authentication means 4 checks the received authentication data against the registered user authentication data stored in the authentication database 6 in step S318, and receives the result of this check in step S319.

Based on the result of this check, in step S320 the authentication means 4 sends the terminal communication means 5 an authentication execution result reply including the authentication execution result.

On receiving the authentication execution result reply, the terminal communication means 5 sends an authentication result reply including the authentication result to the proxy authentication terminal 3 in step S321.

On receiving the authentication result reply, the authentication server communication means 10 in the proxy authentication terminal 3 sends an authentication result notification including the authentication result to the proxy authentication execution means 12 in step S322.

On receiving the authentication result notification, the proxy authentication execution means 12 sends a proxy authentication execution result notification including the authentication result to the terminal detection and control means 21 in step S323.

On receiving the proxy authentication execution result notification, the terminal detection and control means 21, in step S324, sends the network terminal 2 a proxy authentication result notification including the authentication result, for the purpose of notification of the result of the proxy authentication.

On receiving the proxy authentication result notification, the terminal control request receiving means 20 in the network terminal 2, in step S325, sends a proxy authentication result reply to the proxy authentication terminal 3 to notify the proxy authentication terminal 3 that it has received the proxy authentication result, and then transits to the 'no authentication start request' state. The network terminal 2 also resumes service usage processing, depending on the result. For example, if authentication succeeded, the network terminal 2 makes another service provision request to the service server 19; if authentication failed, the network terminal 2 performs other processing, such as canceling the service provision request.

Figure 10C:
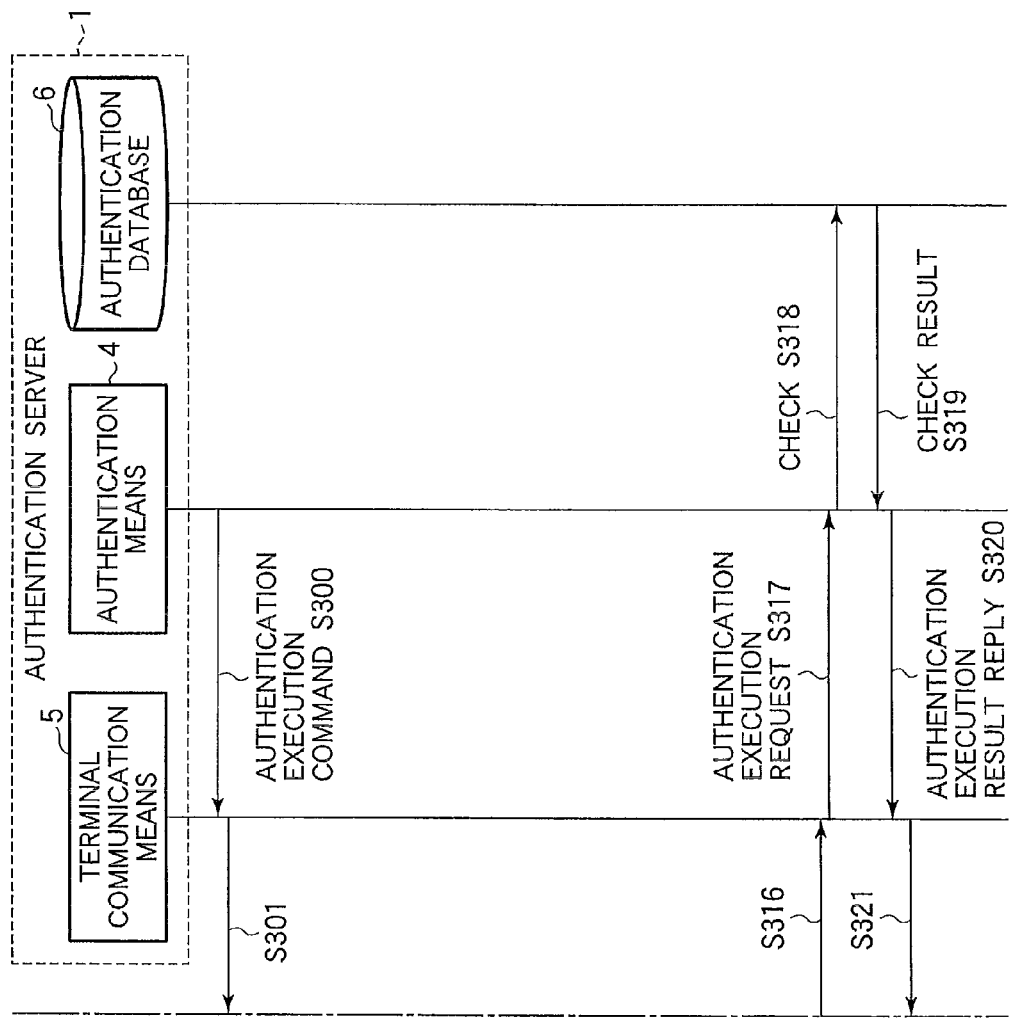
FIG. 10 is a sequence diagram illustrating an authentication procedure by which the network terminal notifies the authentication terminal of a proxy authentication request as an event in the second embodiment of the invention.

A procedure in which the network terminal 2 notifies the proxy authentication terminal 3 of a proxy authentication request as an event in the system in the second embodiment will be described with reference to FIG. 10. The difference from FIG. 9 is that, at the point when step S206 has been completed and the proxy authentication terminal 3 is able to take control by sending commands to the network terminal 2, in step S207 the terminal detection and control means 21 in the proxy authentication terminal 3 sends the terminal control request receiving means 20 in the network terminal 2 a proxy authentication request transmission registration command.

The purpose of proxy authentication request transmission registration is to set the terminal control request receiving means 20 in the network terminal 2 so that when the terminal control request receiving means 20 in the network terminal 2 transits to the 'authentication start requested' state, it will send a proxy authentication request to the proxy authentication terminal 3 as an event notification (to register with the network terminal 2 for notification of the result of the proxy authentication necessity check of the network terminal 2 as an event).

On receiving the proxy authentication request transmission registration command from the proxy authentication terminal 3, the terminal control request receiving means 20 in the network terminal 2 registers the proxy authentication terminal 3 as the destination of proxy authentication requests, and then sends a proxy authentication request transmission registration acknowledgment to the terminal detection and control means 21 in the proxy authentication terminal 3 in step S208.

After this, when the terminal control request receiving means 20 in the network terminal 2 transits to the 'authentication start requested' state, it sends a proxy authentication request to the proxy authentication terminal 3 in step S307. In the sequence in this drawing, the transition of the terminal control request receiving means 20 to the 'authentication start requested' state occurs at the time of step S305, so step S307 is performed immediately after step S208. The subsequent procedure is the same as in FIG. 9.

In the above description, 'to notify as an event' means to notify by an asynchronous message, the timing of which is unpredictable by the receiver. For example, the 'proxy authentication request S307' in FIG. 9 can be regarded as a reply to the 'proxy authentication proposal S306' and accordingly the receiving side can predict its timing, in which sense this request is a synchronous message. On the other hand, the 'proxy authentication request S307' in FIG. 10 has no corresponding request message, and accordingly its timing is unpredictable by the receiving side, in which sense this request is an asynchronous message.

An effect produced by the first and second embodiments described above is that they are configured so that a proxy authentication terminal having an interface for performing personal authentication makes a proxy authentication request check of a network terminal lacking an interface for performing personal authentication, so the user can activate an arbitrary proxy authentication terminal only when necessary and perform personal authentication by using the activated terminal.

The description above assumes that the network terminal 2 lacks an interface necessary to obtain personal authentication, but even if the network terminal 2 has the interface necessary to obtain personal authentication, it may be provided with the proxy authentication terminal detection and control means 9, user interface input-output means 8, and authentication server communication means 7 described in the first embodiment, or the terminal control request receiving means 20, user interface input-output means 8, and authentication server communication means 7 described in the second embodiment. The reason is that even if the network terminal 2 has the interface it needs to obtain personal authentication, the interface may be tricky to use, or may be temporarily malfunctioning; in these and other such situations, a request to another terminal having an authentication function for proxy authentication may be in order.

Third Embodiment

Figure 11:
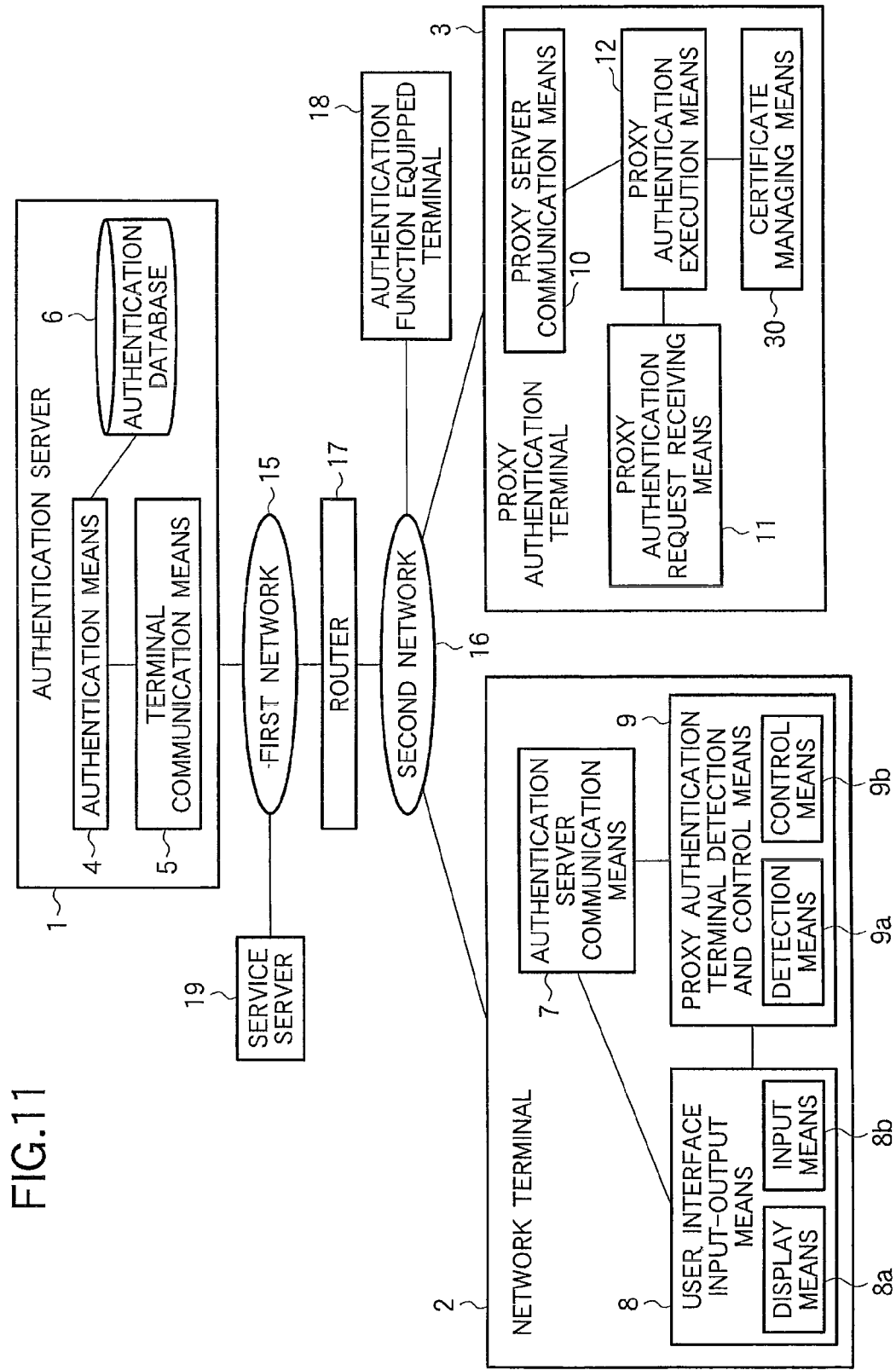
FIG. 11 is a drawing illustrating a system according to a third embodiment of the invention.

Whereas proxy personal authentication was described in the first and second embodiments, proxy authentication for device authentication will be described in the third embodiment. FIG. 11 is a diagram illustrating a system according to the third embodiment of the invention. The system in FIG. 11 is generally the same as the system shown in FIG. 1, but differs in that the authentication operation prompting means 13 for prompting authentication operations by the user and the personal authentication interface 14 for reading information for personal authentication are omitted from the system structure in FIG. 1; instead there is a certificate managing means 30 for managing certificates for performing device authentication.

The operation of the third embodiment will be described below. The third embodiment will also be described on the assumption that both the first network 15 and second network 16 are IP networks. The setting of IP addresses in this case may be performed manually by the user or automatically by use of DHCP, AUTO-IP, or other means.

The procedure in which the network terminal 2 detects the proxy authentication terminal 3 and prepares for control is the same as the procedure described with reference to FIGS. 2 and 3 in the first embodiment.

Figure 12A:
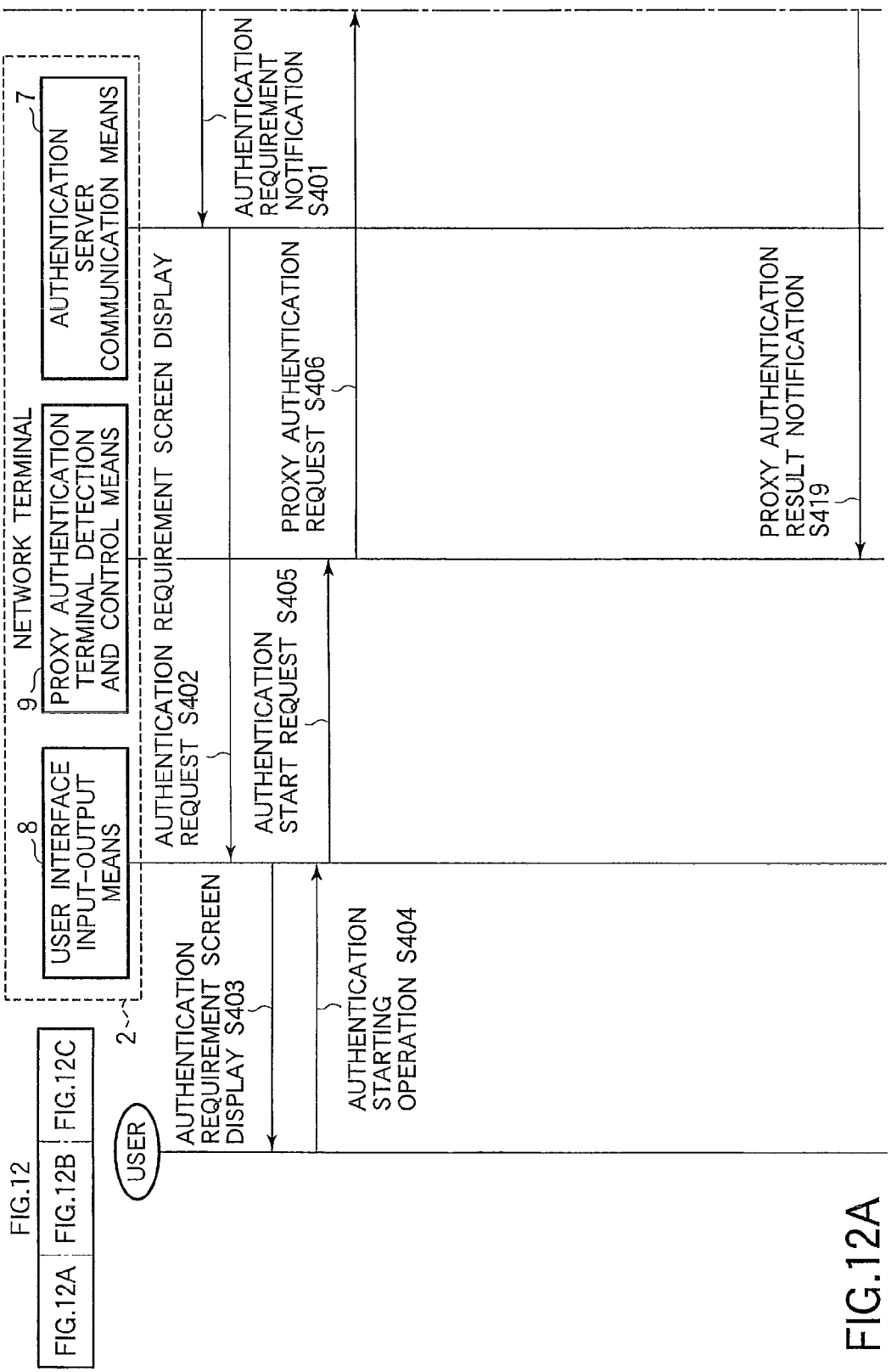
FIG. 12 is a sequence diagram illustrating an authentication procedure in the third embodiment of the invention.
Figure 12B:
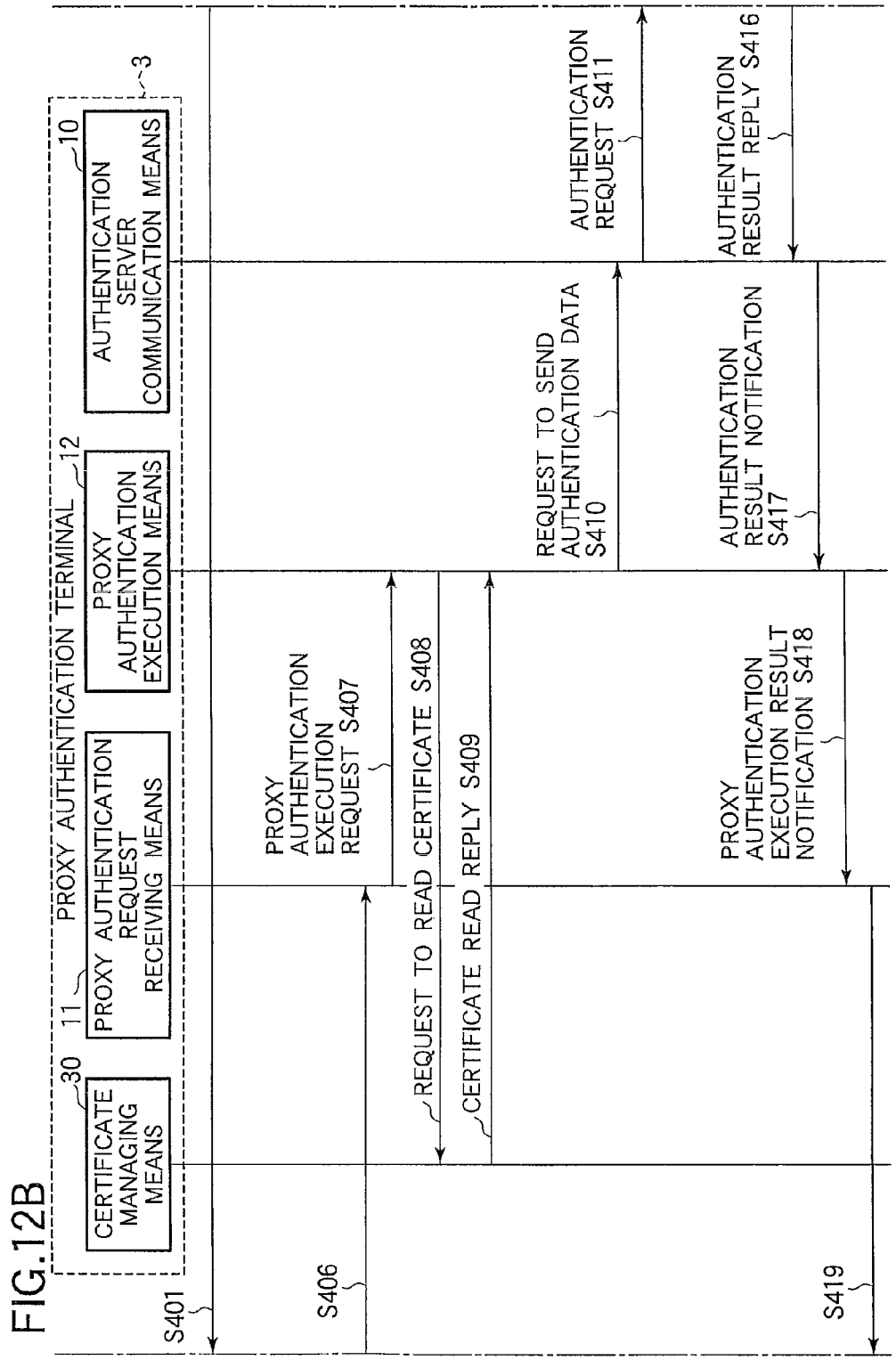
Figure 12C:
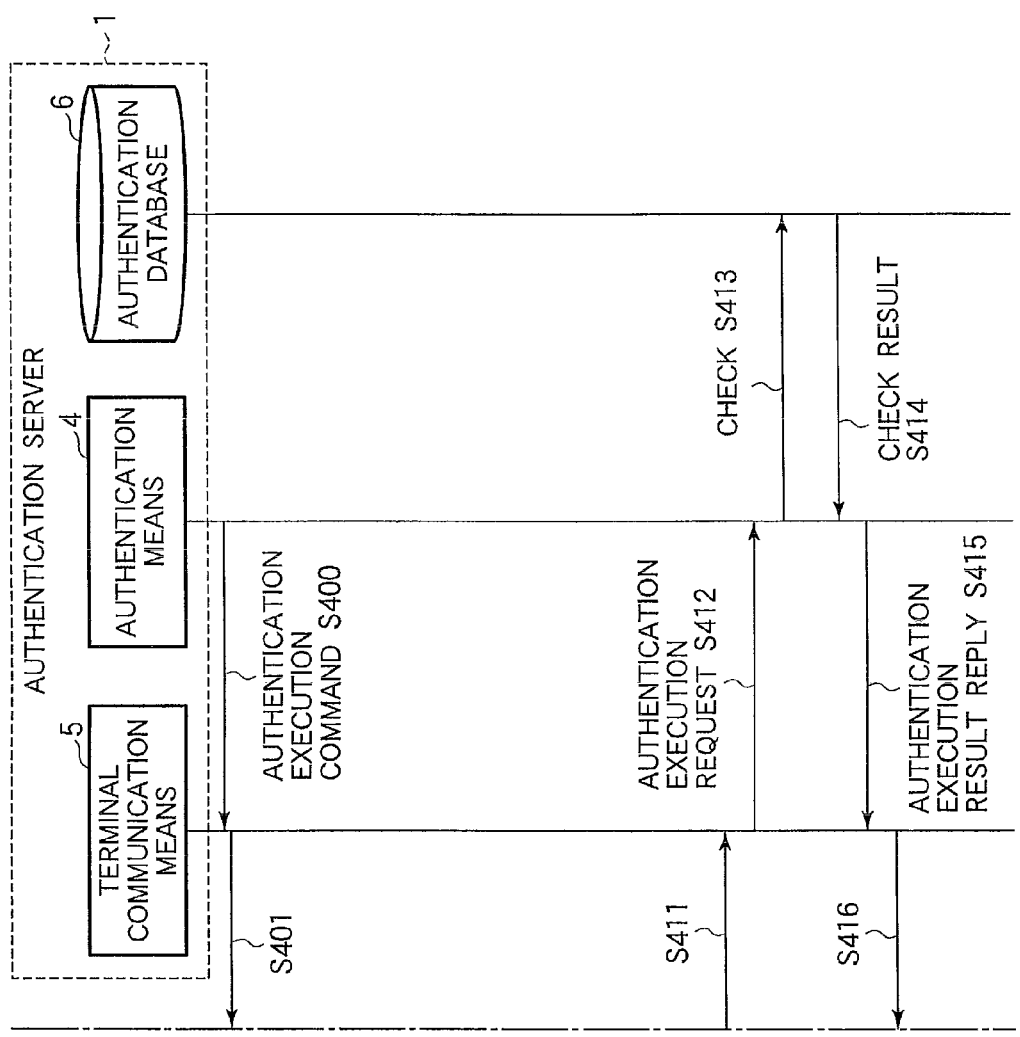

Next, a proxy authentication procedure will be described with reference to FIG. 12. This procedure assumes that a procedure similar to the procedure described with reference to FIG. 2 or 3 has been completed. It is assumed that (mutual) device authentication between the network terminal 2 and proxy authentication terminal 3 has been completed and that a secure communication path is ensured. As a result of a service provision request, requiring personal authentication, made by the network terminal 2 to the service server 19, the service server 19 makes a request to the authentication server 1 for personal authentication of the network terminal 2.

The authentication means 4 in the authentication server 1 sends an authentication execution command to the terminal communication means 5 in step S400.

On reception of the authentication execution command, the terminal communication means 5 sends an authentication requirement notification to the network terminal 2 in step S401. The authentication requirement notification includes an authentication ID generated at the authentication server.

On receiving the authentication requirement notification, the authentication server communication means 7 in the network terminal 2 sends an authentication requirement screen display request to the user interface input-output means 8 in step S402.

On reception of the authentication requirement screen display request, the user interface input-output means 8 performs a display for prompting the user to start device authentication operations in step S403. This display is realized, for example, as a GUI screen displaying a message stating that device authentication is necessary and a 'start authentication' button that the user clicks to start the authentication operation.

The user sees the screen, learns that device authentication is necessary, and performs the authentication starting operation by clicking the 'start authentication' button in step S404, or by other means.

The user interface input-output means 8 detects the authentication starting operation by the user and sends an authentication start request to the proxy authentication terminal detection and control means 9 in step S405.

The device authentication operation may proceed automatically instead of by user operation. In this case, in place of the series of operations from step S402 to step S404, the authentication server communication means 7 sends an authentication start request to the proxy authentication terminal detection and control means 9.

On receiving the authentication start request, the proxy authentication terminal detection and control means 9 sends a proxy authentication request message to the proxy authentication terminal in step S406. The proxy authentication request message includes an ID (referred to as a requesting terminal ID below) identifying the terminal that made the proxy authentication request and the authentication ID passed from the authentication server 1 to the network terminal 2 (received from the authentication server 1) in step S401.

On reception of the proxy authentication request, the proxy authentication request receiving means 11 in the proxy authentication terminal 3 sends a proxy authentication execution request to the proxy authentication execution means 12 in step S407.

In step S408, the proxy authentication execution means 12 sends the certificate managing means 30 a request to read a device authentication certificate. The certificate managing means 30 sends a certificate read reply message including the device authentication certificate to the proxy authentication execution means 12 in step S409. The certificate in this case means, for example, an ITU-T X.509 electronic certificate.

The proxy authentication execution means 12 sends the authentication server communication means 10 a request to send authentication data including the received authentication data together with the requesting terminal ID, the authentication ID, and the device authentication certificate in step S410.

In step S411, the authentication server communication means 10 sends an authentication request message to the authentication server 1. The authentication request message includes the device authentication certificate, requesting terminal ID, and authentication ID. Upon receiving the authentication request, in step S412, the terminal communication means 5 in the authentication server 1 sends the authentication means 4 an authentication execution request including the device authentication certificate, requesting terminal ID, and authentication ID.

From the information given by the received requesting terminal ID and authentication ID, the authentication means 4 checks that this authentication request is for proxy authentication corresponding to the authentication execution command that the authentication means 4 itself issued in step S400. If the result matches, the authentication means 4 checks the received device authentication certificate against the registered device certificate data stored in the authentication database 6 in step S413, and receives the result of this check in step S414.

Based on the result of this check, in step S415 the authentication means 4 sends the terminal communication means 5 an authentication execution result reply including the authentication execution result and authentication completion information. The authentication completion information described herein is, for example, an HTTP cookie or the like.

On receiving the authentication execution result reply, the terminal communication means 5, in step S416, sends the proxy authentication terminal 3 an authentication result reply including the authentication result and authentication completion information.

On receiving the authentication result reply, the authentication server communication means 10 in the proxy authentication terminal 3, in step S417, sends the proxy authentication execution means 12 an authentication result notification including the authentication result and authentication completion information.

On receiving the authentication result notification, the proxy authentication execution means 12, in step S418, sends the proxy authentication request receiving means 11 a proxy authentication execution result notification including the authentication result and authentication completion information.

On receiving the proxy authentication execution result notification, the proxy authentication request receiving means 11, in step S419, sends the network terminal 2 a proxy authentication result notification including the authentication result, for the purpose of notification of the result of the proxy authentication.

On receiving the proxy authentication result notification, the network terminal 2 resumes service usage processing, depending on the result. For example, if authentication succeeded, the network terminal 2 makes another service provision request to the service server 19; if authentication failed, the network terminal 2 performs other processing, such as canceling the service provision request.

The description above assumes that the procedure described in FIGS. 2 and 3 has been completed. If the procedure described in FIGS. 2 and 3 has not been completed, the same operations are carried out as in the procedure described in the first embodiment.

An effect produced by this embodiment is that it enables access to a service requiring device authentication from a network terminal lacking a device authentication certificate, because when a service requiring a device authentication certificate is used, via a network, a request for proxy authentication can be made from the network terminal lacking the device authentication certificate to a proxy authentication terminal having a device authentication certificate.

The third embodiment has been described as a variation of the first embodiment, but a similar variation may also be made for the second embodiment.

What is claimed is:

1. An authentication terminal comprising:
an authentication server communication unit configured to communicate with an authentication server that performs personal authentication via a network;
a terminal communication unit configured to receive a proxy authentication request from a network terminal lacking an interface for reading authentication data for performing personal authentication, and to return a reply to the network terminal;
an interface for reading authentication data for performing personal authentication;
a proxy authentication execution unit configured to read the authentication data from the interface in response to the proxy authentication request from the network terminal; and
an authentication operation prompting unit configured to prompt a user to perform an authentication operation; wherein
in response to the proxy authentication request from the network terminal, a display prompting the user to perform the authentication operation is displayed, the authentication data for performing personal authentication are read when the user performs the operation, an authentication request is sent, together with the read authentication data, to the authentication server, an authentication result is received from the authentication server, and the network terminal is notified of the result.

2. The authentication terminal of claim 1, wherein the proxy authentication request from the network terminal includes, in a message, an authentication ID that the network terminal has received from the authentication server and an ID for identifying the network terminal.

3. A network terminal comprising
an authentication server communication unit configured to communicate with an authentication server for performing personal authentication via a network;
a display unit configured to notify a user that personal authentication is required;
an input unit by which the user performs an operation for starting personal authentication;
a detection unit configured to automatically detect an authentication terminal with an authentication function that can perform proxy authentication for other terminals; and
a control unit configured to send a proxy authentication request to the authentication terminal and to receive a reply including an authentication result from the authentication terminal,
wherein if a plurality of authentication terminals are detected, a proxy authentication request is made to all of the authentication terminals that are detected and an authentication proxy canceling request is sent to all the authentication terminals except for a one of the authentication terminals that returns the reply including the authentication result.

4. An authentication terminal comprising:
a communication unit configured to communicate with an authentication server that performs personal authentication via a network;
a detection unit configured to automatically detect a network terminal lacking an interface for reading authentication data to perform personal authentication;
a communication unit configured to send a proxy authentication necessity check to the network terminal and to receive a result from the network terminal;
an interface for reading authentication data for performing personal authentication;
a proxy authentication execution unit configured to read the authentication data from the interface in response to a proxy authentication request from the network terminal; and
an authentication operation prompting unit configured to prompt the user to perform an authentication operation;
wherein
after sending the proxy authentication necessity check to the network terminal, in response to a proxy authentication request received from the network terminal as a result, the authentication terminal displays a prompt prompting the user to perform the authentication operation, reads the authentication data for performing personal authentication when the user performs the operation, sends an authentication request, together with the read authentication data, to the authentication server, receives an authentication result from the authentication server, and notifies the network terminal of the result.

5. The authentication terminal of claim 4, wherein notification of the result of the proxy authentication necessity check of the network terminal as an event is registered in the network terminal.

6. An authentication terminal comprising:
an authentication server communication unit configured to communicate with an authentication server to perform device authentication via a network;
a terminal communication unit configured to receive a proxy authentication request from a network terminal lacking a function for managing a certificate for performing the device authentication and to return a reply to the network terminal;
an authentication certificate managing unit configured to manage the certificate for performing the device authentication; and
a proxy authentication execution unit configured to read the certificate from the authentication certificate managing unit in response to the proxy authentication request from the network terminal, wherein
in response to the proxy authentication request from the network terminal, the certificate is read, an authentication request is sent, together with the read certificate, to the authentication server, an authentication result is received from the authentication server, and the network terminal is notified of the result.

7. An authentication method performed by an authentication terminal, comprising:
communicating with an authentication server that performs personal authentication via a network;
receiving a proxy authentication request from a network terminal lacking an interface for reading authentication data for performing personal authentication and returning a reply to the network terminal;
reading authentication data for performing personal authentication;
reading the authentication data from the interface in response to the proxy authentication request from the network terminal; and
prompting the user to perform an authentication operation; wherein
in response to the proxy authentication request from the network terminal, a display prompting the user to perform the authentication operation is displayed, the authentication data for performing personal authentication are read when the user performs the operation, an authentication request is sent, together with the read authentication data, to the authentication server, an authentication result is received from the authentication server, and the network terminal is notified of the result.

8. The authentication method of claim 7, wherein the proxy authentication request from the network terminal includes, in a message, an authentication ID that the network terminal received from the authentication server and an ID for identifying the network terminal.

9. An authentication method performed by a network terminal
communicating with an authentication server that performs personal authentication via a network;
notifying a user that personal authentication is required;
receiving input by which the user performs an operation for starting personal authentication;
automatically detecting one or more authentication terminals with an authentication function that can perform proxy authentication for other terminals; and
a control step for sending a proxy authentication request to the authentication terminal and receiving a reply including an authentication result from the authentication terminal,
wherein if a plurality of authentication terminals are detected, a proxy authentication request is made to all of the authentication terminals that are detected and a proxy authentication canceling request is sent to all the authentication terminals except for a one of the detected authentication terminals that returns the reply including the authentication result.

10. An authentication method performed by an authentication terminal comprising:
communicating with an authentication server that performs personal authentication via a network;

automatically detecting a network terminal lacking an interface for reading authentication data to perform personal authentication;

sending a proxy authentication necessity check to the network terminal and receiving a result from the network terminal;

reading authentication data for performing personal authentication;

reading the authentication data from the interface in response to a proxy authentication request from the network terminal; and prompting the user to perform an authentication operation; wherein after the proxy authentication necessity check is sent to the network terminal, in response to a proxy authentication request received from the network terminal as a result, a display prompting the user to perform the authentication operation is displayed, the authentication data for performing personal authentication are read when the user performs the operation, an authentication request is sent, together with the read authentication data, to the authentication server, an authentication result is received from the authentication server, and the network terminal is notified of the result.

11. The authentication method of claim 10, wherein notification of the result of the proxy authentication necessity check of the network terminal as an event is registered in the network terminal.

12. An authentication method performed by an authentication terminal, comprising:

communicating with an authentication server that performs device authentication via a network;

receiving a proxy authentication request from a network terminal lacking a function for managing a certificate for performing device authentication and for returning a reply to the network terminal;

managing a certificate for performing device authentication; and reading the certificate from an authentication certificate managing step in response to the proxy authentication request from the network terminal, wherein in response to the proxy authentication request from the network terminal, the certificate is read, an authentication request is sent, together with the read certificate, to the authentication server, an authentication result is received from the authentication server, and the network terminal is notified of the result.

* * * * *